United States Patent
Yamada

(10) Patent No.: US 7,672,533 B2
(45) Date of Patent: Mar. 2, 2010

(54) JUDGING IMAGE TYPE WITH AN IMAGE SCANNING DEVICE

(75) Inventor: Kazumi Yamada, Nagano-ken (JP)

(73) Assignee: Seiko Epson Corporation, Tokyo (JP)

(*) Notice: Subject to any disclaimer, the term of this patent is extended or adjusted under 35 U.S.C. 154(b) by 1217 days.

(21) Appl. No.: 11/216,062

(22) Filed: Sep. 1, 2005

(65) Prior Publication Data
US 2006/0062476 A1   Mar. 23, 2006

(30) Foreign Application Priority Data
Sep. 21, 2004  (JP) ............................. 2004-273372

(51) Int. Cl.
G06K 9/40  (2006.01)
G06K 9/62  (2006.01)
H04N 1/409  (2006.01)
(52) U.S. Cl. ........................ 382/274; 382/224; 358/3.27
(58) Field of Classification Search ................ 382/162, 382/167, 224, 274; 345/581, 589, 590; 358/3.27
See application file for complete search history.

(56) References Cited

U.S. PATENT DOCUMENTS 6,151,426 A * 11/2000 Lee et al. ..................... 382/319
6,160,249 A * 12/2000 Webb et al. ............... 250/208.1
6,532,077 B1 * 3/2003 Arakawa .................... 358/1.13
6,549,660 B1 * 4/2003 Lipson et al. ............... 382/224
7,142,711 B2 * 11/2006 Goto et al. .................. 382/167
2002/0196479 A1 * 12/2002 Simske ....................... 358/474

FOREIGN PATENT DOCUMENTS

JP    2004-104662 A    4/2004

* cited by examiner

Primary Examiner—Benny Q Tieu
Assistant Examiner—Eric A Rust
(74) Attorney, Agent, or Firm—Sughrue Mion, PLLC

(57) ABSTRACT

In the process of control of an image scanning device that creates image data by scanning an image from a recording medium on which the image is recorded, the image scanning device is controlled to acquire first image data by scanning the image at a first scanning resolution; image type is judged on the basis of this first image data; and in the process of controlling the image scanning device to scan the image at a second scanning resolution, second image data is acquired under image acquisition conditions dependent on the image type indicated by the judgment result in the image judgment step.

5 Claims, 14 Drawing Sheets

FIG.1
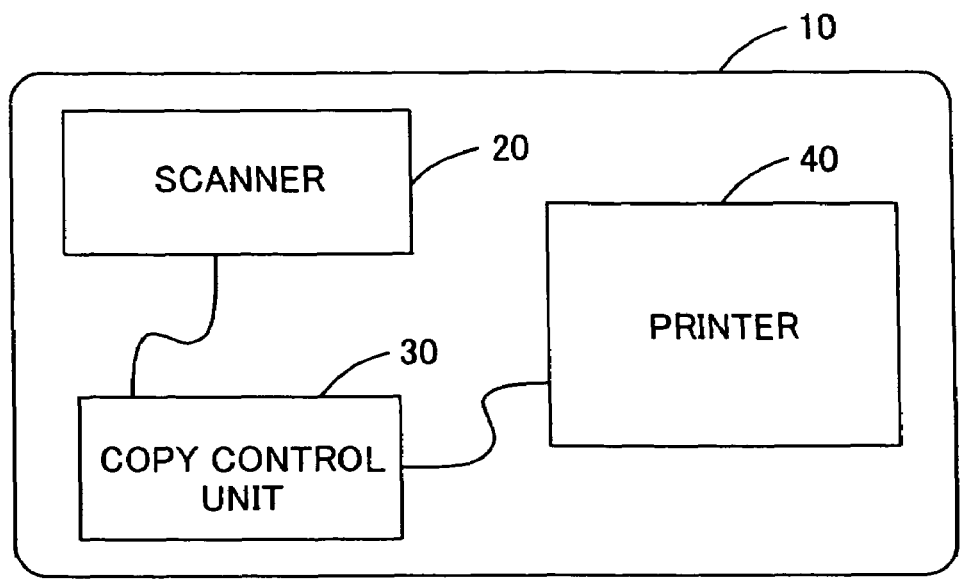
(a)
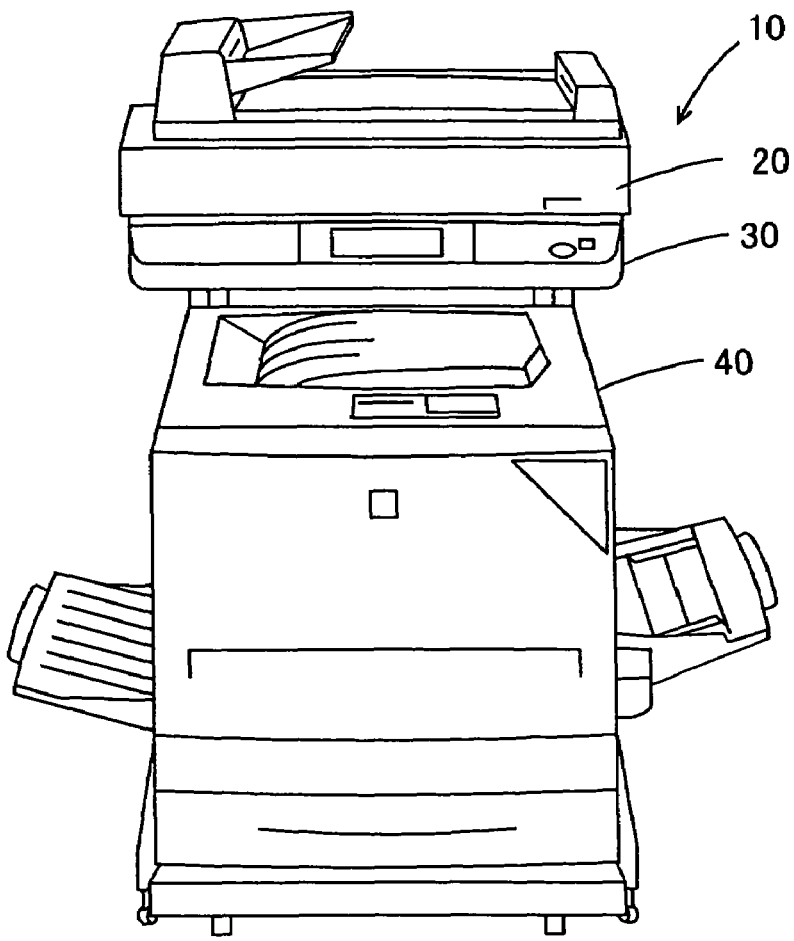
(b)

FIG.8
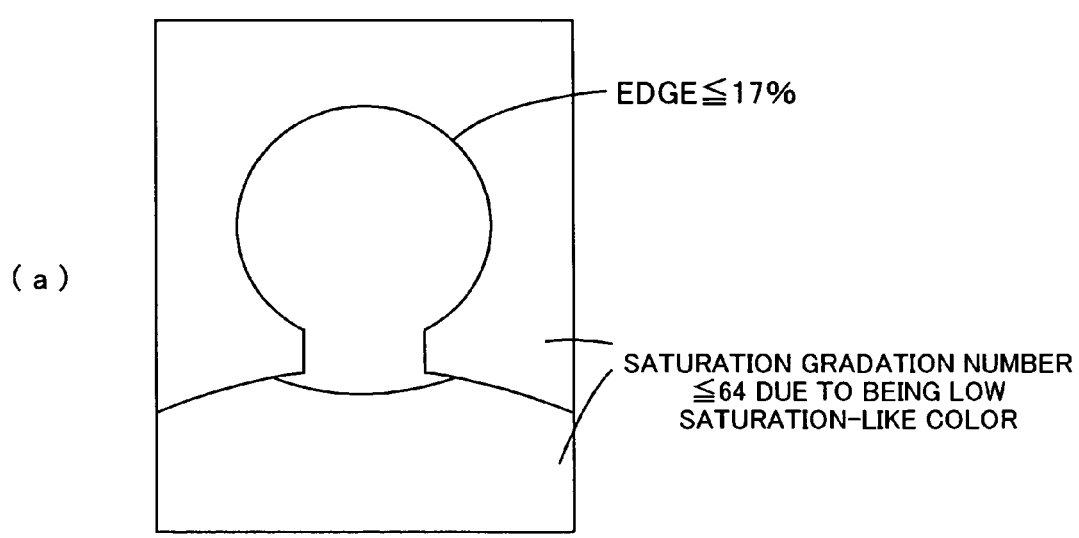
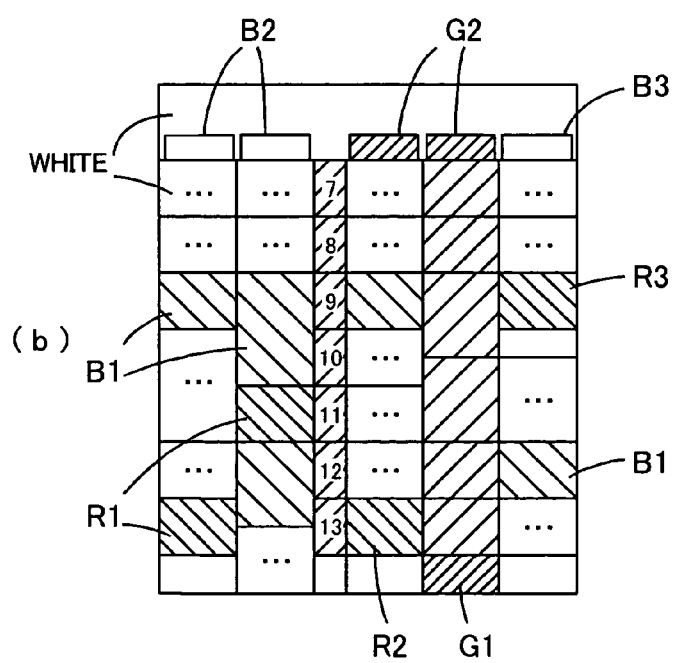

FIG.12
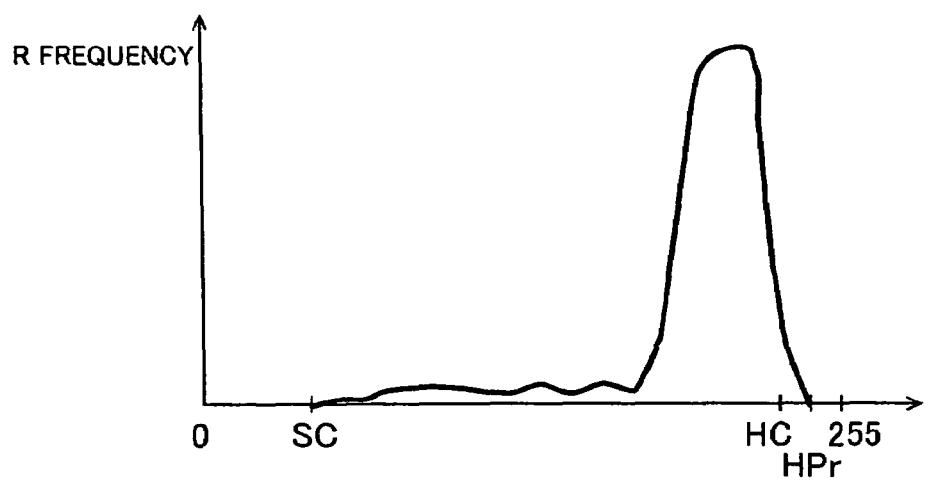
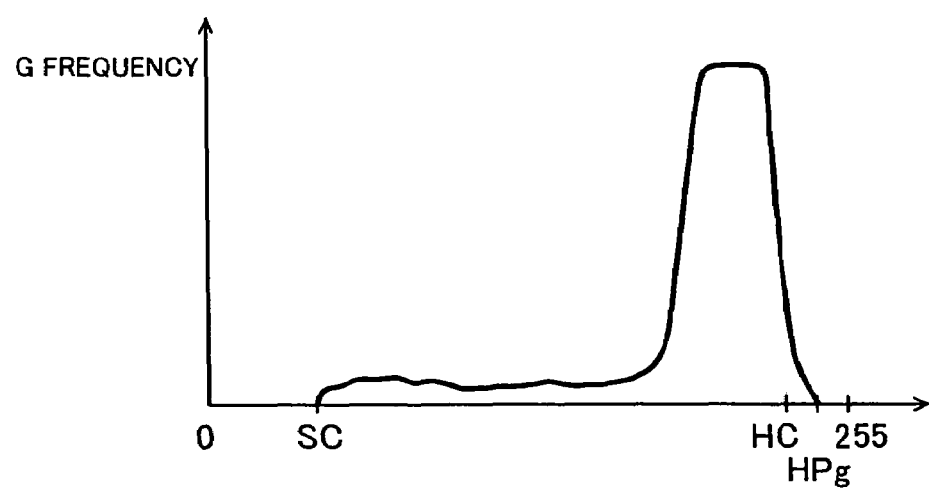
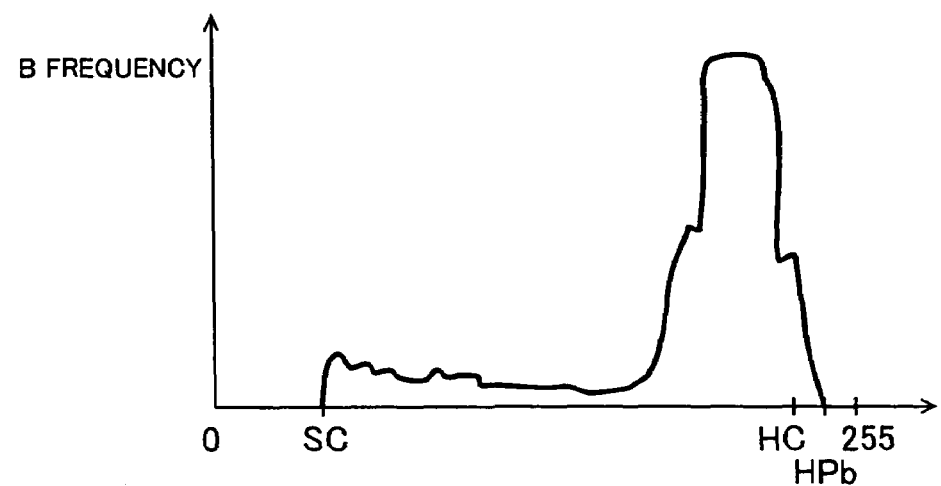

JUDGING IMAGE TYPE WITH AN IMAGE SCANNING DEVICE

BACKGROUND OF THE INVENTION

Field of the Invention

The present invention relates to an image scanning device, an image scanning method, an image scanning program, a copier, a copier control method, and a copier control program.

In copiers and similar devices, there is known in the art an approach whereby during scanning of an original document to create digital data, text portions and photograph portions of an image are distinguished, and on the basis of the distinction, image processing of the different portions is carried out (see Unexamined Patent Application 2004-104662, for example).

SUMMARY OF THE INVENTION

In a copier, image processing is performed for the purpose of executing printing, and accordingly image data scanned at high resolution is needed in order to execute printing with high quality. However, image data scanned at high resolution contains a large volume of data, and judgment of image type on the basis of this large volume of data entails a heavy processing load. Also, where image processing is carried out after the image data for printing has been acquired by the scanner, scanning cannot be carried out in a manner according to image type.

With the foregoing in view, it is an object of the present invention to provide an image scanning device, an image scanning method, an image scanning program, a copier, a copier control method, and a copier control program, whereby it is possible to judge image type quickly, and to carry out image processing in a manner according to image type during scanning of an image.

To achieve the stated object at least in part, in the present invention, scanning is carried out twice, judging the type of image on the basis of first image data scanned at a first scan resolution. Then, second image data is acquired at image acquisition conditions in accordance with the judged image type. Specifically, since an image is scanned and the type of image judged prior to acquisition of the second image data, conditions can be established in accordance with the type of image when acquiring the second image data. Accordingly, image data can be acquired in a state appropriate for each type of image.

In scanning of an image, it suffices to be able to scan the image from a recording medium having the image recorded thereon, to acquire image data that indicates the image. Accordingly, it is possible to employ scanners of various kinds, such as a scanner that scans original paper documents, as well as scanners that can scan other media, such as recording media or film.

In the image type judgment process, it suffices to be able to judge image type; to accomplish this, it would acceptable to establish a certain criterion for a characteristic quantity indicating a characteristic of an image, and to judge image type depending on whether a characteristic quantity calculated on the basis of the first image data meets this criterion. That is, it suffices to be able to ascertain in advance the nature of the behavior of a characteristic quantity on a per-image type basis, and to distinguish among image type by means of establishing a criterion for the characteristic quantity in question.

Image types may be classified according to whether images have content in common. Specifically, it is acceptable to be able to classify images into a first type and a second type depending on different image content. For example, images that include artificially created images such as text, lines, patterns or the like, and images that include natural images such as photographs taken of trees, mountains, buildings, or other landscape scenes can be classified as different types. Where both kinds of images are included, an image may be classified as either type depending on which it most closely approximates.

In the step of acquiring the second image data, in the course of controlling the image scanning device in order to acquire the second image data at second scan resolution, it suffices to be able to scan an image at image acquisition conditions according to the type of image indicated by the results of the judgment mentioned above. Here, the process of scanning an image at image acquisition conditions according to the type of image includes image processing according to the type of image. For example, in ordinary scanning, during creation of image data gradation is sometimes changed by means of a tone curve, or sharpness enhancement is carried out to produce an image of high picture quality; where the degree to which these kinds of image processing are applied differs, the image acquisition conditions can be said to differ as well.

Thus, by carrying out image processing according to image type in this way, image processing appropriate for each image type can be applied, and image data of high picture quality can be obtained. Of course, here it suffices to be able to acquire images under conditions depending on image type; in the image scanning device, and arrangement whereby sensor sensitivity or light source illumination intensity is adjustable may be employed, and the sensor sensitivity or light source intensity adjusted according to the type of image. Also, scanning resolution may vary depending on the type of image.

In any event, according to the present invention, scanning is carried out twice, with image type being judged on the basis of the first scan result; thus, even in instances a large volume of data would be required to carry out printing at high picture quality, the first image data for judging the image does not require a large volume of data. Accordingly, it is possible to carrying out judgment of images quickly. If printing of a high picture quality image turns out to be required, resolution for the second image data can be set to high resolution where needed, and thus according to the present invention, quick judgment of image type and creation of a high picture quality image can be achieved simultaneously.

In particular, in some instances the image scanning device will be constituted so as to be capable of a preview scan; implementation of the invention is preferred in such instances. Specifically, since a preview scan is typically carried out at lower resolution than a full scan, by using the data produced by the preview scan as the first image data and the data produced by the full scan as the second image data, image type can be judged without the use of an excessively large amount of data.

Distinguishing between image types that include artificially created images and image types that includes natural images is preferable in terms of carrying out processing according to image type in the process of acquiring second image data. That is, image types that include artificially created images are typical images of black or highly saturated color lines, patterns, or the like formed on a white background, and in many instances detailed gradation representation in the white background areas is not necessary, nor is detailed gradation representation of black text needed.

In a natural image, on the other hand, it is preferable to minimize gradation compression (a state in which pixels originally having different brightness are represented with identical brightness) in both the high brightness range and low brightness range. Accordingly, the intended image processing will differ between the two kinds of images. Where the two can be distinguished from one another, it becomes possible to apply appropriate image processing to each image type.

In preferred practice the results of this distinction will be reflected in image processing to change the plurality color components that make up the second image data, by a certain level of change for the color components. Specifically, where the plurality color components are changed by a certain level of change, gradation representation of the original image data is changed. In particular, it is possible to carry out contrast enhancement by changing color components while partly ignoring a high brightness range that includes maximum brightness and a low brightness range that includes minimum brightness, or by carrying out input/output conversion defining a generally S-shaped curve for input/output characteristics.

In processing of this kind, since the acceptable level of gradation compression will differ between a natural image and an artificially created image, in preferred practice the level of contrast enhancement, i.e. the level of change of color components, will vary by image type. As a result, it becomes possible to carry out appropriate image processing depending on image type.

In the image type judgment process, once images have been distinguished, they may be classified into finer sub-classes. Specifically, even where a certain type can be distinguished from another by way of image type, when comparisons are made within respective image types, there are instances in which it would be preferable to acquire second image data at different data acquisition conditions, despite being classified as the same type. In such cases, by classifying images of the same type into finer sub-classes, in the process of acquiring second image data. It becomes possible to establish data acquisition conditions on a per sub-class basis, for acquiring the second image data.

Where image type has been distinguished as being either an artificially created image or a natural image in the above manner, image types that include artificially created images are classified into finer sub-classes, and image types that include natural images are classified into finer sub-classes. Various conceptual approaches may be employed as approaches to classification into sub-classes; for example, sub-class may be decided upon depending on whether a specific color in an image is distributed disproportionately, or depending on lightness of the image overall.

In the image type judgment process, image type may be judged on the basis of a single criterion; however, in order to carry out judgment more accurately, once an initial judgment has been made, it may then be re-checked. Specifically, judgment may be made as to whether the type of image indicated by the aforementioned first image data is the first type, and judgment then made as to whether the image is of the second type. As a result, even if an image that is actually of the second type were erroneously judged in the initial judgment as being of the first type, since in the second judgment it is judged to whether it is of the second type, the incidence of erroneous judgments can be reduced.

Additionally, even if an image that is actually of the first type were erroneously judged in the initial judgment as not being of the first type, since in the second judgment it is judged to whether it is of the second type, by deeming it here to be of the first type by virtue of an judgment that it is not of the second type, the incidence of erroneous judgments can be reduced. Since the criterion for judging whether an image is of the first type and the criterion for judging whether it is of the second type are different, it is very effective to carry out judgment twice.

The image processing method set forth above may embody the idea of the invention in various forms, such as being worked in a single device or worked together with another method in a state of being incorporated into a certain machine; and may be modified appropriately. Of course, the invention may also be reduced to practice as an image processing device. When working the invention, a certain program or programs may be executed by devices of various kinds. The invention may also be reduced to practice as such a program.

The invention also functions as a copier for carrying out printing on the basis of second image data acquired using the aforementioned image scanning device, control method for same, or program. That is, second image data scanned under appropriate conditions depending on image type can be created, and an image scanning device, control method for same, or program capable of carrying out high quality copying can be provided.

It is possible to use storage media of any kind to provide a program. For example, magnetic recording media and magneto-optical recording media are acceptable; and any recording media that may be developed in the future may be considered similarly. The idea of the invention differs nowise where realized in part through software and in part through hardware; and a form where portions are recorded onto a storage medium and read out as needed would be encompassed as well.

BRIEF DESCRIPTION OF THE DRAWINGS

FIG. 1 is an illustration showing a copier.
FIG. 8 is an illustration depicting the advantage of making a second judgment.
FIG. 12 is an example of histograms in a photograph image which is a very light image.

DETAILED DESCRIPTION

Figure 2:
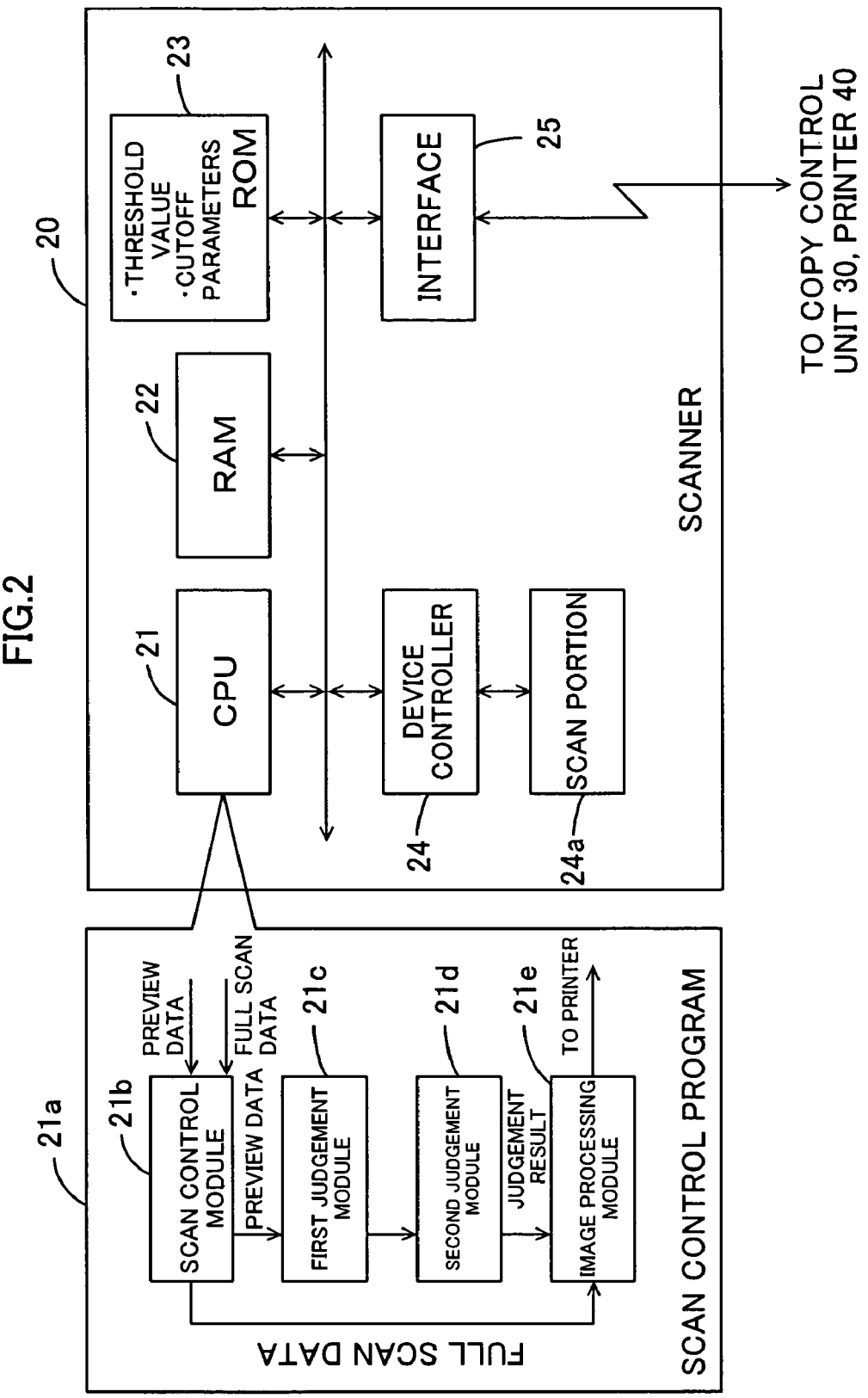
FIG. 2 is a block diagram of a scanner.

The following description of the embodiments of the invention is made in the order indicated below.
(1) Arrangement of Copier:
(2) Copy Process:
   (2-1) Parameter Calculation Process:
   (2-2) Cutoff Value Decision Process:
(3) Other Embodiments:

(1) Arrangement of Copier

FIG. 1 is an illustration showing a copier 10 embodying the image processing device which pertains to the invention. FIG. 1(a) is a simplified schematic of the copier 10, and FIG. 1(b) is an illustration showing the exterior of the copier. As shown in the drawing, the copier 10 pertaining to this embodiment of the invention is composed of a scanner 20, a printer 40, and a copy control unit 30 connected to these.

FIG. 2 is a block diagram of the scanner 20. The scanner 20 is a device that, when an original is set in the ADF (Auto Document Feeder), transports it to an original document scanning portion, where the image on an original document is scanned. At this time, the scanned image is represented by image data. In image data in this embodiment, the image is made up of a plurality of pixels, with RGB (red, green blue) color density of each pixel being represented with 256 levels of gradation. The scanner 20 comprises a CPU 21, RAM 22, and ROM 23, with the CPU 21 executing a control program stored in the ROM 23, while using the RAM 22 as work memory. Scanning operation in the scanner is achieved in this way.

Specifically, the scanning portion 24a comprises a light source (LED or the like) for illuminating the original; a sensor (CCD or the like) for sensing the reflected light; and an original document conveyor mechanism. The CPU 21 controls the scanning portion 24a through a device controller 24. By so doing, transport of the original and digitalization of content recorded on the original are carried out. That is, RGB image data is created. An interface 25 sends data of various kinds to the copy control unit 30 through connection lines, and carries out processes such as sending image data by means of processing by the CPU 21, and handling instructions from the copy control unit 30.

During scanning by the CPU 21, a scan control program 21a that includes the image judgment process of the invention is carried out. In FIG. 2, a functional block diagram of the scan control program 21a is shown at left; as shown in the drawing, this program comprises an image scanning module 21b, a first judgment module 21c, a second judgment module 21d, and an image processing module 21e.

The image scanning module 21b is responsible for the process that controls the scanning portion 24a via the device controller 24; it acquires image data of the image of the original document placed on the document stage, at the scanning resolution instructed by the copy control unit 30 described later. The scanning resolution may be set to various resolutions; in this embodiment, in the course of a single copy operation, two scans, namely, a preview scan and a full scan, are carried out. Here, the preview scan is carried out at lower resolution than the full scan, and the process finishes faster. The full scan is the scan that generates the original data for printing the image.

In this embodiment, by means of processing by the first judgment module 21c and the second judgment module 21d, an image for copying is clipped out from the image data obtained with the preview scan (preview data), and the type and sub-class of the image are judged. Accordingly, in this embodiment the image scanning module 21b, the device controller 24, and the scanning portion 24a correspond to the aforementioned image scanning portion, and the process carried out by the first judgment module 21c and the second judgment module 21d correspond to the process of judging image type. Also, in this embodiment, the first judgment module 21c judges whether the image type is of a type including text (this includes artificially created lines, patterns, and other images as well, but is referred to herein as text), while the second judgment module 21d judges whether the image type is a type that includes a photograph (natural image).

For an image not judged by the first judgment module 21c as being of a type that includes text, the second judgment module 21d judges whether the image is a photograph; or in the event that the image has been judged by the first judgment module 21c as being of a type that includes text, performs a recheck as to whether it is of photograph type. Accordingly, even in the event of an erroneous judgment by the first judgment module 21c that an image does not include text, it can nevertheless be determined that the image truly does include a photograph, and more accurate judgments can be made. Or, in the event of an erroneous judgment by the first judgment module 21c that an image includes text, it can nevertheless be determined that the image truly does not include a photograph, and more accurate judgments can be made.

In the first judgment module 21c, even where an image includes text, it is further classified into a sub-class depending on whether the image has color cast; and in the second judgment module 21d, even where an image includes a photograph, it is further classified into a sub-class depending on the level of brightness of the image overall.

The image processing module 21e carries out a contrast enhancement process and a sharpness enhancement process on image data created by the full scan (full scan data). At this time, the image processing module 21e carries out image processing appropriate to the particular sub-class determined by the first judgment module 21c and the second judgment module 21d. The image processed data is handed over to the printer 40 via the interface 25.

In this embodiment, data after the aforementioned image processing corresponds to the aforementioned second image data, and the process by the image processing module 21e corresponds to the process of acquiring the aforementioned second image data. Specifically, the scan result by the scanning portion 24a is acquired by the image scanning module 21b, and even if the acquired result has been subjected to a contrast enhancement process or sharpness enhancement process, in view of the result that the second image data is obtained by the image processing module 21e, it can be considered that the second image data is obtained under different image acquisition conditions. That is, image processing after scanning has been initially carried out is included among image acquisition conditions, and settings prior to scanning (e.g. CCD sensitivity, scan resolution, etc.) are also included among image acquisition conditions.

Data needed when carrying out judgment of image type and image processing has been previously recorded in the ROM 23. Specifically, the first judgment module 21c and the second judgment module 21d make judgments utilizing various threshold values, described later. Threshold value data indicating these threshold values is recorded in the ROM 23. When the image processing module 21e performs contrast enhancement, a gradation value range smaller than a cutoff value in shadow portions and a gradation value range greater than a cutoff value in highlight portions are ignored, with cutoff parameters determined in advance for each sub-class, for the purpose of calculating these cutoff values, being recorded in the ROM 23.

Figure 3:
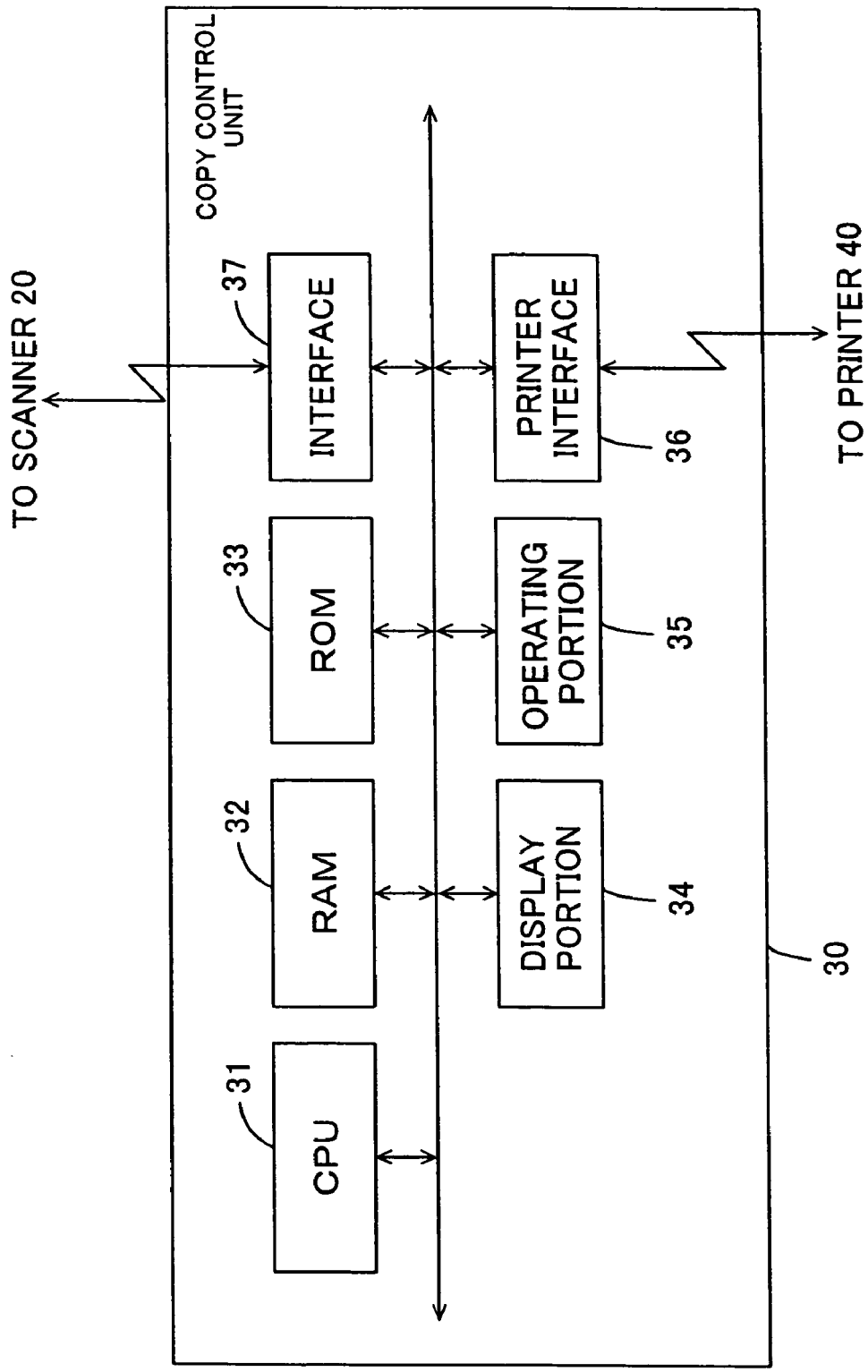
FIG. 3 is a block diagram of a copy control unit

FIG. 3 is a block diagram of the copy control unit 30. Like the scanner 20, the copy control unit 30 comprises a program execution environment of a CPU 31, RAM 32, and ROM 33, with the CPU 31 executing a control program stored in the ROM 33, while using the RAM 32 as work memory. The copy control unit 30 provides the user with copy conditions and the like, and is responsible for the process of handling control inputs by the user.

For this reason, there are provided a display portion 34 (LCD etc.) for presenting to the user information such as original document type, printing paper sizes and so on, a control portion 35 (push buttons, a touch panel, or the like) enabling the user to input desired information, a printer interface 36 and an interface 37. The CPU 31 performs control of the display portion 34 and the control portion 35, carrying out processes to provide the user with needed information and to handle resolution instructions, Copy Start instructions, and so on. Instructions so obtained are output to the scanner 20 or printer 40.

Figure 4:
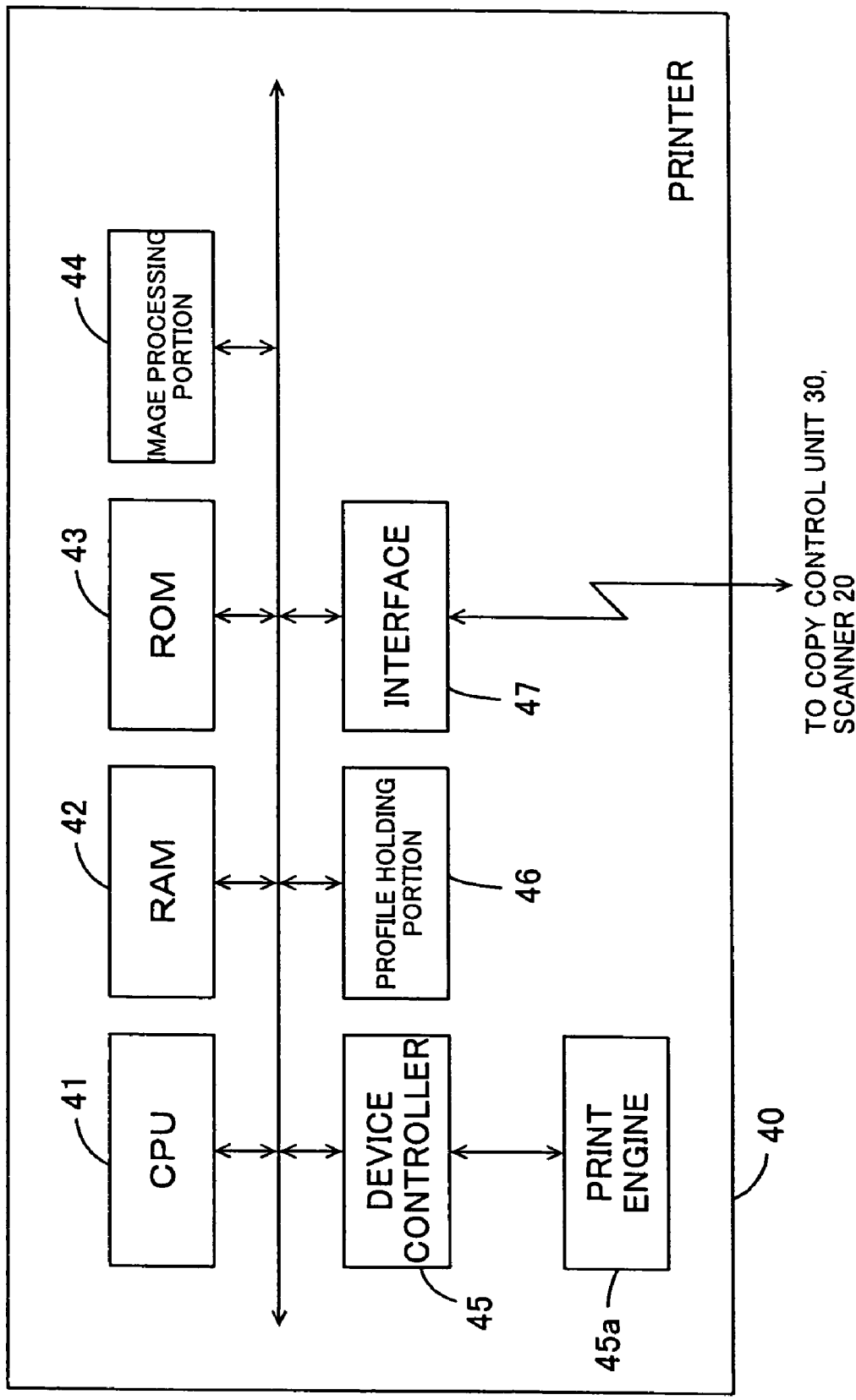
FIG. 4 is a block diagram of a printer.

FIG. 4 is a block diagram of the printer 40. In the drawing, the CPU 41 executes a control program stored in the ROM 43, while using the RAM 42 as work memory. Certain image processing is performed by an image processing portion 44 (custom IC or the like), and the process of recording a recording material onto the printing paper is carried out by the device controller 45 and the print engine 45*a*. Additionally, the printer 40 has an interface 47.

Specifically, on the basis of an instruction from the copy control unit 30, the CPU 41 is responsible for performing transfer of data and carrying out appropriate image processing; upon receiving image data from the image processing module 21*e*, it causes the image processing portion 44 to carry out processing of the output image data. The image processing portion 44 is an IC that carries out color conversion making reference to a profile, and a halftone process; it generates halftone data specifying recording material levels for outputting colors indicated by the image data output by the image processing module 21*e*.

While the recording material is not limited as to color, it is possible to employ CMYK (cyan, magenta, yellow, black) for example. In this case, the image processing portion 44, referring to a profile held in a profile holding portion 46, converts RGB color system image data into the CMYK color system. That is, gradation values that correspond to recording material usage levels for the colors CMYK is created from the original image data. The image processing portion 44 additionally reduces the gradation number of these gradation values to create halftone data.

While not shown in the drawing, the print engine 45*a* comprises a photoreceptor unit, exposure unit, developing unit, printer paper feed unit, and the like; in accordance with the halftone data, toner is transferred onto the photoreceptor, and the toner is then transferred and fused onto the printer paper to effect printing. The print engine 45*a* is controlled by the device controller 45, with the device controller 45 handling the halftone data and controlling the units so as to record the recording material in accordance with the halftone data.

(2) Copying Process

Figure 5:
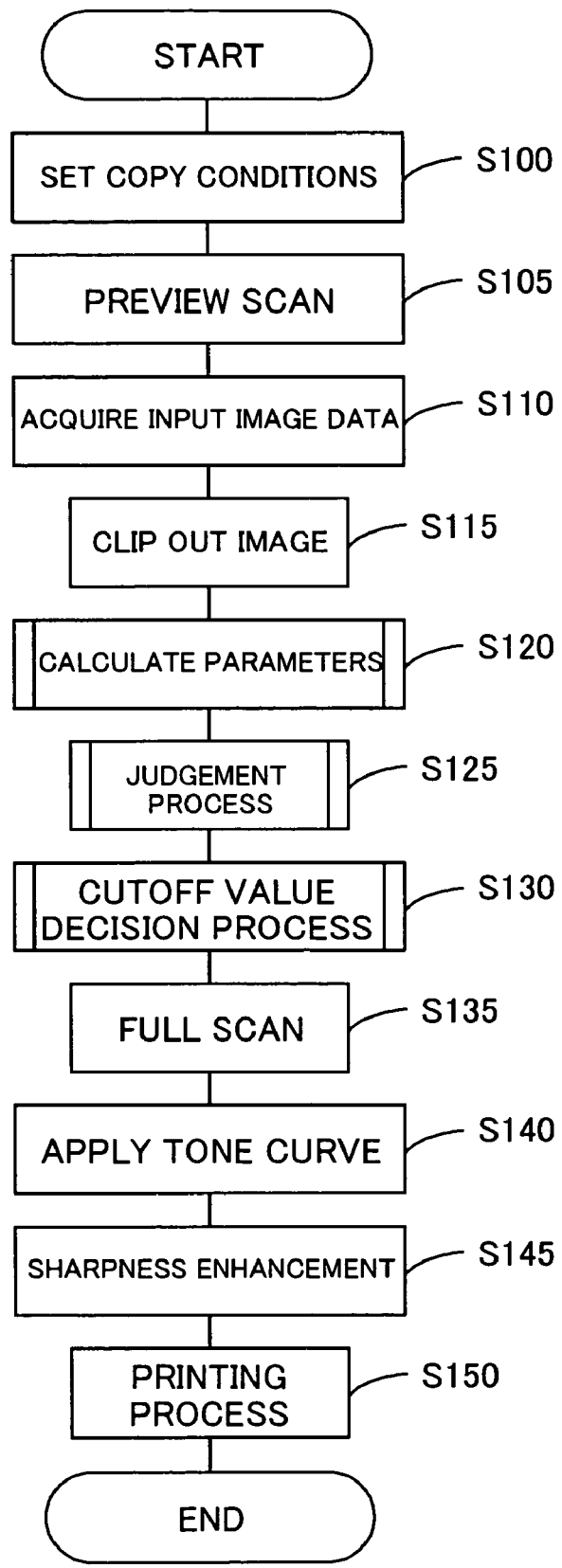
FIG. 5 is a general flowchart of a copying process.

The copying process in the copier 10 will now be described. FIG. 5 is a general flowchart of a copying process. During copying, first, while verifying the display content on the display portion 34, the user uses the control portion 35 to set the printing conditions (Step S100). Specifically, on the display portion 34 of the copy control unit 30 there is displayed an interface for selecting scanning conditions and printing conditions during copying, enabling the user to set the scanning conditions and printing conditions via the control portion while visually monitoring the interface.

It is possible to employ conditions of various kinds as scanning conditions, for example, setting scanning resolution and original document size. Likewise it possible to employ conditions of various kinds as printing conditions, for example, setting printing paper size, color during printing (i.e. to specify monochrome or color), or the like. Once copying conditions have been set, the CPU 31 outputs to the scanner 20 data indicating a Start Scan instruction. When this data is acquired in the scanner, the image scanning module 21*b* shown in FIG. 2 outputs an instruction to the device controller 45, and the preview scan resolution specified in Step S100 is set. A preview process to scan the original document is then performed under control of the device controller 24 (Step S105).

The image data obtained in the preview is acquired by the image scanning module 21*b* (Step S110). Clipping out of the image for analysis is then performed (Step S115). Specifically, since a scanned document is sometimes smaller than the area scanned by the scanner 20, the image on the document being scanned is analyzed, and a process to clip out an image corresponding to the original document is performed, for the purpose of printing. Here, it suffices to be able to clip out an image corresponding to the original document; it is possible to employ various processes for this purpose, such as detecting shadows produced at the borders of the document by light projected from the light source in the scanning portion 24*a*, in order to extract the borders of the document.

Once a target for analysis has been acquired through clipping out an image, a parameter needed in order to judge the type of image is calculated (Step S120). As parameters, it is possible to employ various kinds of characteristic quantities indicating characteristics of images. In this embodiment, pixel brightness Y, lightness L, saturation s, and brightness difference with neighboring pixels are calculated as characteristic quantities, and statistical indices of the characteristic quantities are calculated. Specifically, histograms and average values of brightness Y and color components RGB; standard deviation of brightness Y; a histogram of saturation s; and the proportion of edge pixels (pixels whose brightness difference with respect to a neighboring pixel is above a certain threshold value, e.g. 60) are calculated.

Brightness Y, lightness L, and saturation s may be calculated from RGB color component values using equations known in the art; or values corresponding to RGB color component values calculated with reference to a profile created in advance; it being possible to employ various arrangements for this purpose. When calculating the aforementioned statistical index, in the event that pixel brightness Y is "0" or "255", that pixel may be excluded from those targeted for analysis. Specifically, in scanned image data, values of "255" indicating maximum brightness and "0" indicating minimum brightness are in many cases due to noise or limited representational power, rather than indicating actual image color; if this is a concern, such pixels may be eliminated from those analyzed for the purpose of calculating a characteristic quantity.

Once a parameter has been calculated in Step S120, the first judgment module 21*c* and the second judgment module 21*d*, using this parameter, perform an judgment process to judge the type and sub-class of the aforementioned clipped out image (Step S125). Once image type and sub-class have been judged, a cutoff value decision process is carried out (Step S130). Here, the cutoff value is a value use during the subsequent contrast enhancement process, for specifying a gradation value range ignored in shadow areas and highlight areas during contrast enhancement. Specifically, this is a process whereby during contrast enhancement, gradation values ranging from 0 to the shadow cutoff value are ignored; gradation values ranging from the highlight cutoff value to 255 are ignored; and the remaining gradation value range is reassigned gradation values of 0-255, with these cutoff values decided in Step S130.

Next, the image scanning module 21b outputs an instruction to the device controller 24, and the full scan resolution specified in Step S100 is set. Then, under control by the device controller 24, the full scan process is carried out to scan the original document (Step S135). Since image type and sub-class have been determined for image data obtained in the full scan, the image processing module 21e applies a tone curve to the image data, depending on its sub-class (Step S140), and performs contrast enhancement. Additionally, the image processing module 21e carries out sharpness enhancement of the resultant image data, depending on the type of image (Step S145).

Contrast enhancement will be described in detail later. Sharpness enhancement is carried out by an appropriate process that depends on the type or sub-class of an image; in this embodiment, the process is carried out with a higher level of sharpness enhancement for images that include text, and a lower level of sharpness enhancement for images that include photographs. Specifically, since text by its very nature has distinct borders, text is represented more distinctly with a higher level of sharpness enhancement. In many instances, sharpness enhancement will improve appearance in a natural image in a photograph as well, but if edges stand out to an extreme extent, appearance conversely suffers, so the level of sharpness enhancement is less than for text.

In the above manner, in this embodiment the level of contrast enhancement and the level of sharpness enhancement differ by image type or sub-class, and as a result the conditions for image processing to which the image data is subjected will differ, so that image acquisition conditions differ for each sub-class. Of course, in the processes described above, the scan resolution during the full scan may be modified, or sensor sensitivity modified, for each image type and sub-class. In any event, once the aforementioned image processing has been carried out, the image data that has been image processed by the image processing module 21e is output to the printer 40. In the printer 40, the aforementioned image processing portion 44 etc. perform processing based on the image data, and the printing process is carried out by the print engine 45a (Step S150).

Figure 6:
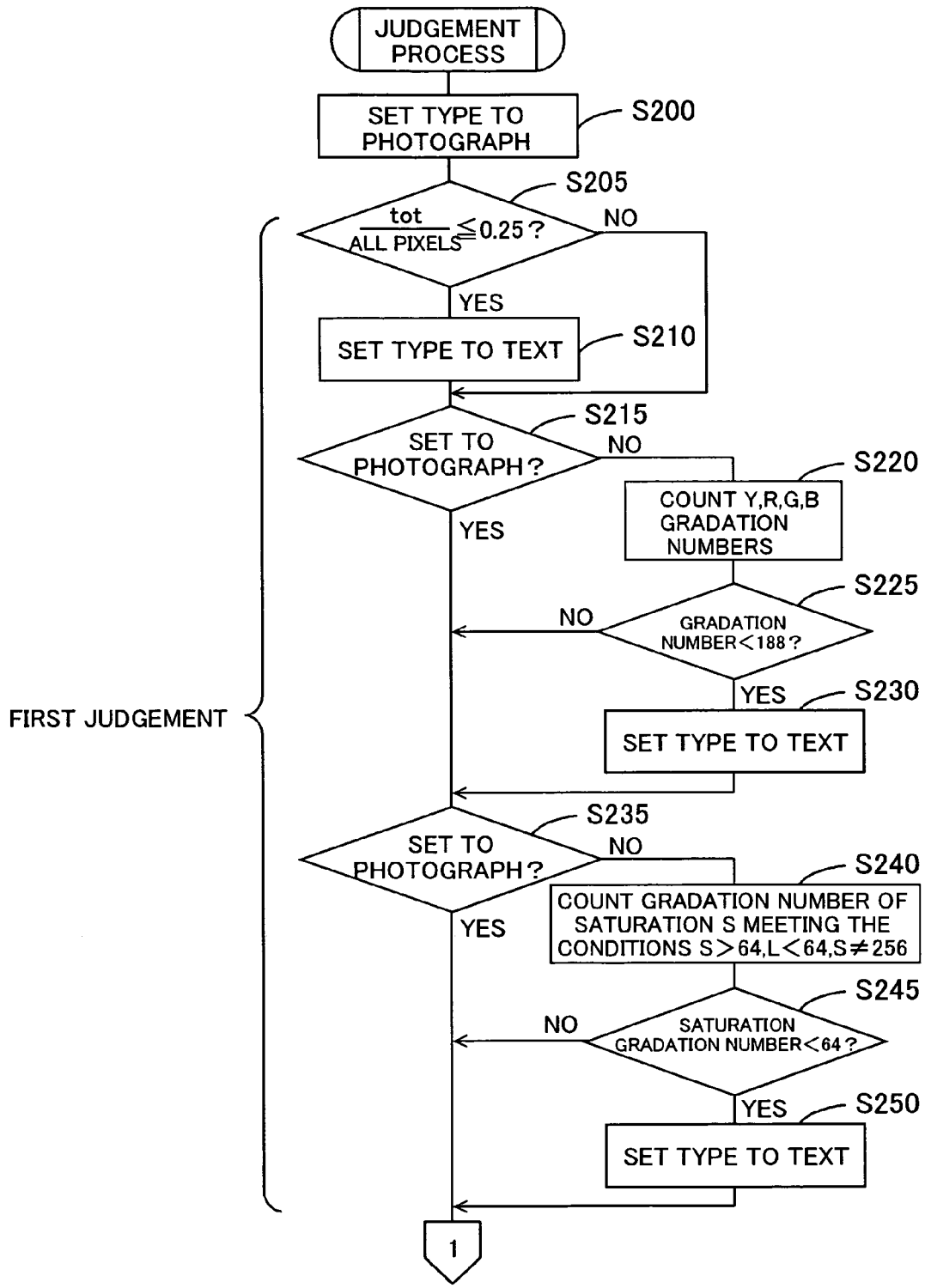
FIG. 6 is a flowchart of a judgment process for judging image type.

(2-1) Judgment Process:

Next, the judgment in Step S125 will be described in detail. FIG. 6 is a flowchart of the judgment process. In this embodiment, a variable indicating photograph type and sub-class are established, and by substituting this variable with a value indicating a judgment result, it is possible to subsequently refer back to the judgment result. Accordingly, first, the image type is set to photograph (Step S200). Next, on the basis of pixels with brightness Y of "0" and "255" as a proportion of the total, it is judged whether the image type includes text.

Specifically, a determination as made as to whether dividing tot—which represents the total number of pixels excluding those with brightness Y of "0" and "255"—by the total number of pixels gives a result of 0.25 or less (Step S205). Specifically, since (tot/total pixels) represents a proportion based on total pixel count excluding pixels of maximum brightness and minimum brightness, a smaller proportion means that a greater number of pixels with brightness Y of "0" or "255" are included in the image data of the preview result.

Since pixels of maximum brightness (brightness Y of "255") are white and pixels of minimum brightness (brightness Y of "0") are black, it may be assumed that a typical image containing such pixels in large numbers will be one having black text formed on a white background. When in Step S205 it is determined that (tot/total pixels)≦0.25, image type is set to text (Step S210), whereas when in Step S205 it is not determined that (tot/total pixels)≦0.25, the process skips Step S210.

Next, referring the aforementioned variable, determination is made whether image type has been set to photograph (Step S215). When in Step S215 it is not determined to be the photograph setting, on the basis of brightness Y and color component RGB gradation number, determination is made as to whether the image is of an image type that includes text. Accordingly, brightness Y and color component RGB gradation number is counted (Step S220), and it is determined whether gradation number is smaller than "188" (Step S225). When determined that gradation number is smaller than "188", the image type is set to text (Step S230).

Specifically, in text or other artificially created images, since color is determined artificially, gradation number tends to be smaller than with natural images. Accordingly, a typical upper limit for gradation number includable in text or other artificially created images is decided upon in advance, and by judging whether the gradation number of an image after preview is smaller than this gradation number, it is determined whether the image is text. Brightness Y and color component RGB gradation number can be calculated by referring to histograms. Specifically, gradation values whose frequency in a histogram is not "0" may be counted one by one, taking the sum.

After the process of Step S230, and when determined in Step S215 that the setting is photograph, when in Step S225 it is not determined that gradation number is smaller than "188", it is rejudged whether the setting is photograph (Step S235). If in this Step S225 it is not determined that the setting is photograph, on the basis of image saturation s, it is then determined whether the image is of a type that includes text. For this purpose, the gradation number of saturation s meeting the conditions s>64, L>64, and s≠256 is counted (Step S240), and it is determined whether gradation number is smaller than "64" (Step S245). If not determined that gradation number is smaller than "64", image type is set to text (Step S250).

Specifically, where chromatic color is used in an image created artificially, such as lines or patterns, color is selected artificially, and in virtually all cases colors of high saturation and lightness are used to improve appearance. Accordingly, a typical lower limit for gradation number includable in text or other artificially created images is decided upon in advance, and by judging whether saturation gradation number of an image after preview is smaller than this lower limit, it is determined whether the image is text or other artificially created image. Here as well, saturation gradation number can be calculated by referring to a histogram. Since saturation s=256 is white, this is excluded from the gradation number count.

Figure 7:
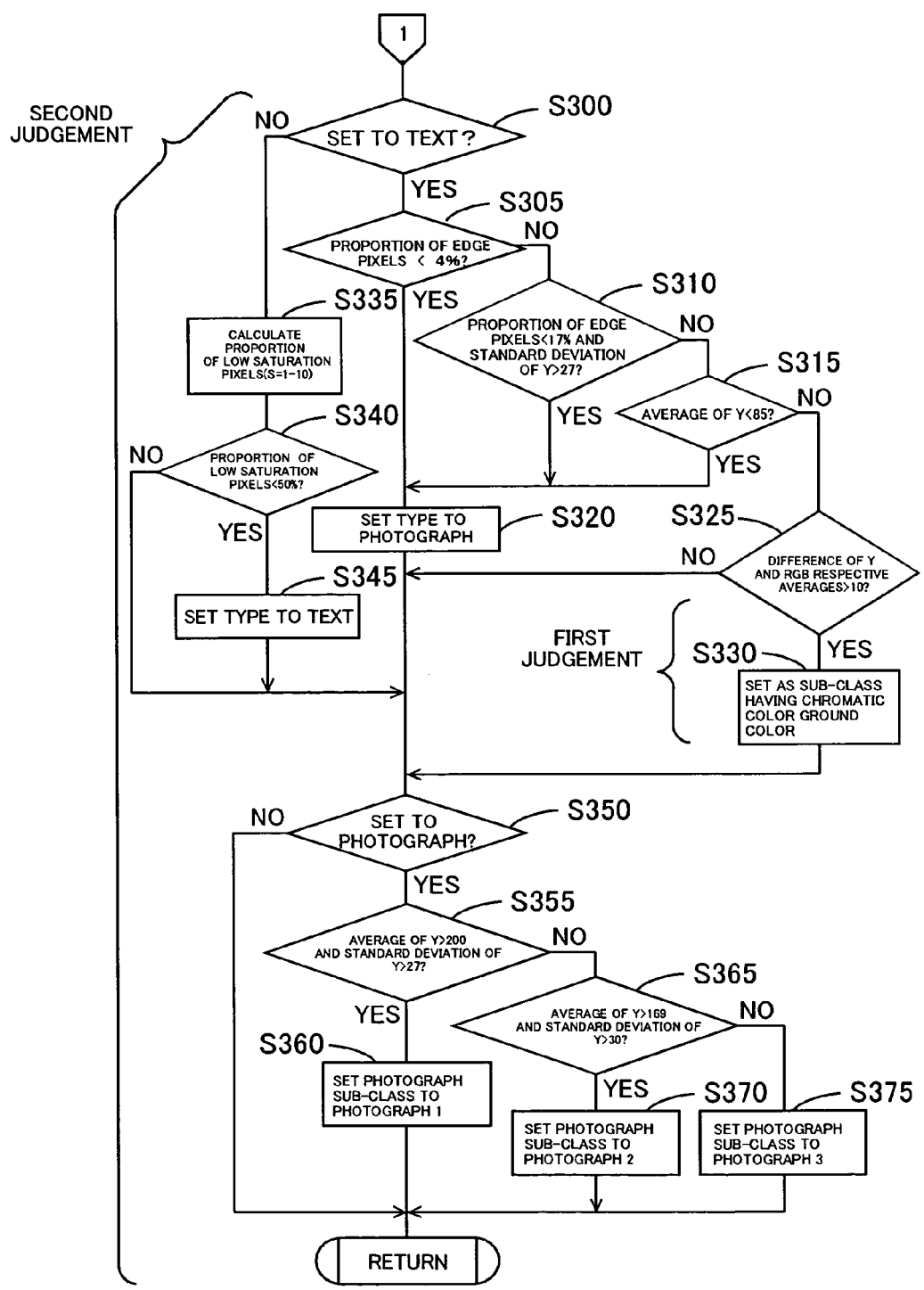
FIG. 7 is a flowchart of a judgment process for judging image type.

Once judgment by the first stage has been carried out in this way, an additional second stage judgment is carried out. In FIG. 7, the second stage judgment is principally depicted. In order to carry out the second stage judgment, the second judgment module 21d performs judgment on the basis of a statistical index of a characteristic quantity in the image. First, referring to the aforementioned variable, it determines whether image type has been set to text (Step S300). If determined to be set to text, in Step S305 and subsequent it checks whether the image is a photograph. That is, judgment is carried out by the second judgment module 21d so that even if a judgment as text is an incorrect judgment, the incorrect judgment may be corrected reliably.

For this purpose, firstly, it is determined whether the proportion of edge pixels is less than 4% (Step S305). That is, in most instances the borders of text or other artificially created image are edges, with the text etc. being enclosed by these edges. Accordingly, if image type is one composed of writing, drawings or the like, it will likely include a given proportion of edges. For this reason, the proportion of edge pixels is compared with a threshold value (in this embodiment, 4%), and when the proportion is smaller than the threshold value, image type is set to photograph (Step S320).

To provide certainty, in the second judgment module 21*d*, additional judgment is carried out on the basis of a different criteria. For this purpose, when in Step S305 it is not determined that the proportion of edge pixels is less than 4%, it is then further determined whether the proportion of edge pixels is less than 17%, and whether the standard deviation of brightness Y is greater than 27 (Step S315). That is, since a photograph contains high levels of continuous gradation change, the spread of the gradation value distribution is quite large, whereas text, drawings, and other such artificial images have small gradation number, so that the spread of the gradation value distribution is small. Thus, by referring to the standard deviation of brightness Y, which indicates the spread of the gradation value distribution, it can be decided that a wider distribution is closer to a photograph.

In the case of a photograph, edge pixels will tend to be fewer in number than a text image, as noted previously. Accordingly, in Step S310, the threshold value for determining the proportion of edge pixels is larger than in Step S305, and in association therewith the standard deviation of brightness Y is referred to as well, when judging whether the image is a photograph. Specifically, if in Step S310 it is determined that the proportion of edge pixels is smaller than 17% and that the standard deviation of brightness Y is greater than 27, in Step S320 the image type is set to photograph.

If in Step S310 it is not determined that the proportion of edge pixels is smaller than 17% and that the standard deviation of brightness Y is greater than 27, it is then determined whether the average of brightness Y is smaller than 85 (Step S315). That is, in most instances, text or other artificially created image have very light background (e.g. white). Even assuming that maximum brightness pixels have been eliminated in the manner described previously, if the background is light, may high brightness pixels will be contained. In the case of a picture, on the other hand, the background will not necessarily be light as compared to writing or the like. Accordingly, if average brightness is smaller than a threshold value (85 in this embodiment) it can be determined that the image is a photograph. Accordingly, if in Step S315 it is determined that the average of brightness Y is smaller than 85, in Step S320 the image type is set to photograph.

If in Step S315 it is not determined that the average of brightness Y is smaller than 85, the image type will be one that includes text; here, image types that include text are further classified into sub-classes. In this embodiment, image types that include text are classified into different sub-classes depending on whether ground color includes chromatic color, and for this purpose it is judged whether color is distributed disproportionately (Step S325). Specifically, the difference of the average value of brightness Y and the average value of color component R is calculated, and it is determined whether this difference exceeds 10. Similar judgments are made for the difference of the average value of brightness Y and the average value of color component G, and the difference of the average value of brightness Y and the average value of color component B.

Specifically, since brightness Y is a value that includes intensity of all of the color components RGB (the brightness equivalent value can be calculated as Y=(38R+76G+14B)/ 128 for example), the average of brightness Y and the color components are compared, and if the difference with any color component stands out appreciably, that color is distributed disproportionately in the image overall. Accordingly, in this embodiment, disproportionately distributed color is detected depending on whether this difference exceeds 10; if in Step S325 it is determined that a color is distributed disproportionately, the image is classified in the sub-class of images that include text and that have chromatic color background (Step S330). If in Step S325 it is not determined that the difference exceeds 10, it is not placed in the sub-class of images that have a chromatic color background.

On the other hand, if in the aforementioned Step S300 it is not determined to be set to text, the image type will have been set to photograph, and starting with Step S335 it is checked whether this image is of image type that includes text. Specifically, judgment is performed by the second judgment module 21*d* so that even in the event that the judgment of being non-text is an erroneous judgment, the erroneous judgment can be corrected.

For this purpose, the proportion of low-saturation pixels (with saturation s of 1-10) is calculated (Step S335), and it is determined whether the proportion of low-saturation pixels exceeds 50% (Step S340). If in Step S340 it is determined that the proportion of low-saturation pixels exceeds 50%, the image type is set to text (Step S345), whereas if not determined to be in excess of 50%, Step S345 is skipped. Specifically, in an image having black text formed on a white background, since the background and text are achromatic colors, low-saturation pixels will be numerous. Utilizing this fact, in this embodiment, a threshold value (50%) is set for the proportion of low-saturation pixels, and by comparing the proportion of low-saturation pixels with this threshold, it is judged whether the image is of a type that includes text.

After the above process has been performed, for photograph images, the second judgment module 21*d* now classifies the image in a sub-class. In this embodiment, extremely light photograph images are classified in a sub-class designated Photograph 1, photograph images that are light overall but darker than Photograph 1 are classified in a sub-class designated Photograph 2, and other classes are classified in a sub-class designated Photograph 3.

For this purpose, first, referring to the aforementioned variable, it is determined whether the image has been set to photograph (Step S350). If not determined to have been set to photograph, Steps S355-S375 are skipped. If determined to have been set to photograph, it is then judged whether the average of brightness Y exceeds 200, and additionally whether the standard deviation of brightness Y exceeds 27 (Step S355). That is, where the average of brightness Y exceeds 200, the image is defined as being an extremely light image. In order to make judgment with greater certainty, the standard deviation of the photograph image is judged together with the average of brightness Y.

If in Step S355 it is determined that the average of brightness Y exceeds 200 and furthermore that the standard deviation of brightness Y exceeds 27, the aforementioned variable is set to indicate that the image is a photograph image of the sub-class Photograph 1 (Step S360). If in Step S355 it is not determined that the average of brightness Y exceeds 200 and that the standard deviation of brightness Y exceeds 27, it is then judged whether the average of brightness Y exceeds 169 and additionally whether the standard deviation of brightness Y exceeds 30 (Step S365).

Specifically, in the event that the average of brightness Y is not as high as 200 but exceeds 169, the image is deemed to be light overall. In this case as well, in order to make judgment with greater certainty, the standard deviation of the photograph image is judged together with the average of brightness Y. If in Step S365 it is determined that the average of brightness Y exceeds 169 and furthermore that the standard deviation of brightness Y exceeds 30, the aforementioned variable is set to indicate that the image is a photograph image of the sub-class Photograph 2 (Step S370). If in Step S365 it is not determined that the average of brightness Y exceeds 169, and that the standard deviation of brightness Y exceeds 30, the aforementioned variable is set to indicate that the image is a photograph image of the sub-class Photograph 3 (Step S375).

Once judgments have been made by the first judgment module 21c and the second judgment module 21d in the above manner, the routine returns to the process shown in FIG. 5. In the present invention, image type is judged with greater certainty by means of having judgment results of the first judgment module 21c rechecked by the second judgment module 21d. FIG. 8 is an illustration depicting the advantage of performing a second judgment. The image shown in FIG. 8(a) is a photograph of a human subject. In such a photograph of a human subject, if the background and the clothing of the human subject are of similar, low-saturation color (e.g. color close to white), brightness Y, color component RGB, and saturation s gradation number in the image will be small.

Specifically, brightness Y and color component RGB gradation numbers may be smaller than the threshold value of 188 in the judgment of Step S225. Saturation gradation number may be smaller than the threshold value of 64 in the judgment of Step S245. Accordingly, while the first judgment module 21c may make the judgment that the image is text, this judgment is an erroneous judgment. Meanwhile, in this example, while distinct edges are present at the contours of the human subject and in the background, there are not many edges present in other areas. In particular, since the background and clothing are of similar color, the proportion of edge pixels will be even lower.

Accordingly, in the judgment by the second judgment module 21d, it is either determined in Step S305 that the proportion of edge pixels is 4% or less, or determined in Step S310 that proportion of edge pixels is 17% or less. Even where brightness Y gradation number is small, since the values thereof are spread apart, the standard deviation will easily exceed 27. As a result, in Step S305 or S310 it will be determined that the image is a photograph.

The image shown in FIG. 8(b) is an image of a TV program schedule, and is composed of text and lines. Accordingly, the image is of the type that includes text. However, the schedule also has chromatic color applied to the background and text, indicated by R1-R3, G1, G2 and B1-B3. Here, R1-R3 are red colors, G1 and G2 are green colors, and B1-B3 are blue colors. In the illustrated example, R1-R3, G1, G2 and B1-B3 are exemplary.

In an image of this kind, even if color on the original document is a single color, it is not the case that in the image data created by scanning the document, image data for areas of the same color will always be identical. Accordingly, brightness Y and RGB color component gradation number may exceed the threshold value of 188 in the judgment of Step S225. Also, saturation s gradation number may exceed the threshold value of 64 in the judgment of Step S245. Thus, in some instances the image will not be designated as including text, without passing through Step S230 or S250.

However, in such instances as well, the image can be correctly judged as being text by means of the judgments of Steps S300 and S335-S345. Specifically, even where the image includes chromatic color, the background of the image is achromatic color approximating white, and the text is achromatic color approximating black. Accordingly, in the judgment of Step S340 it will be determined that the proportion of low-saturation pixels exceeds 50%. As a result, the image will be judged as being one that includes text. In this way, in the case of an atypical image, it is possible for an erroneous judgment to be made, despite carrying out judgment in the first judgment module 21c on the basis of a characteristic feature quantity such as text. However, since further judgment is performed by the second judgment module 21d, image type can be judged with greater certainty.

In the above process, in Steps S305-S320 and Steps S340, S345, an erroneous judgment of the judgment of the first judgment module 21c is rechecked, and the process corresponds to the second stage judgment. The process in Steps S325, S330 performs sub-classification for image types that include text, and thus corresponds to the process of additionally deciding on a sub-class for the first stage judgment. The judgment by the second judgment module 21d is premised on a judgment having been previously made by the first judgment module 21c, and thus it is possible to set more stringent threshold values (4%, 17%, standard deviation of 27, and brightness average of 85 taught hereinabove). That is, criteria that are stricter than the broad criteria for judging whether an image is a photograph can be established.

Figure 9:
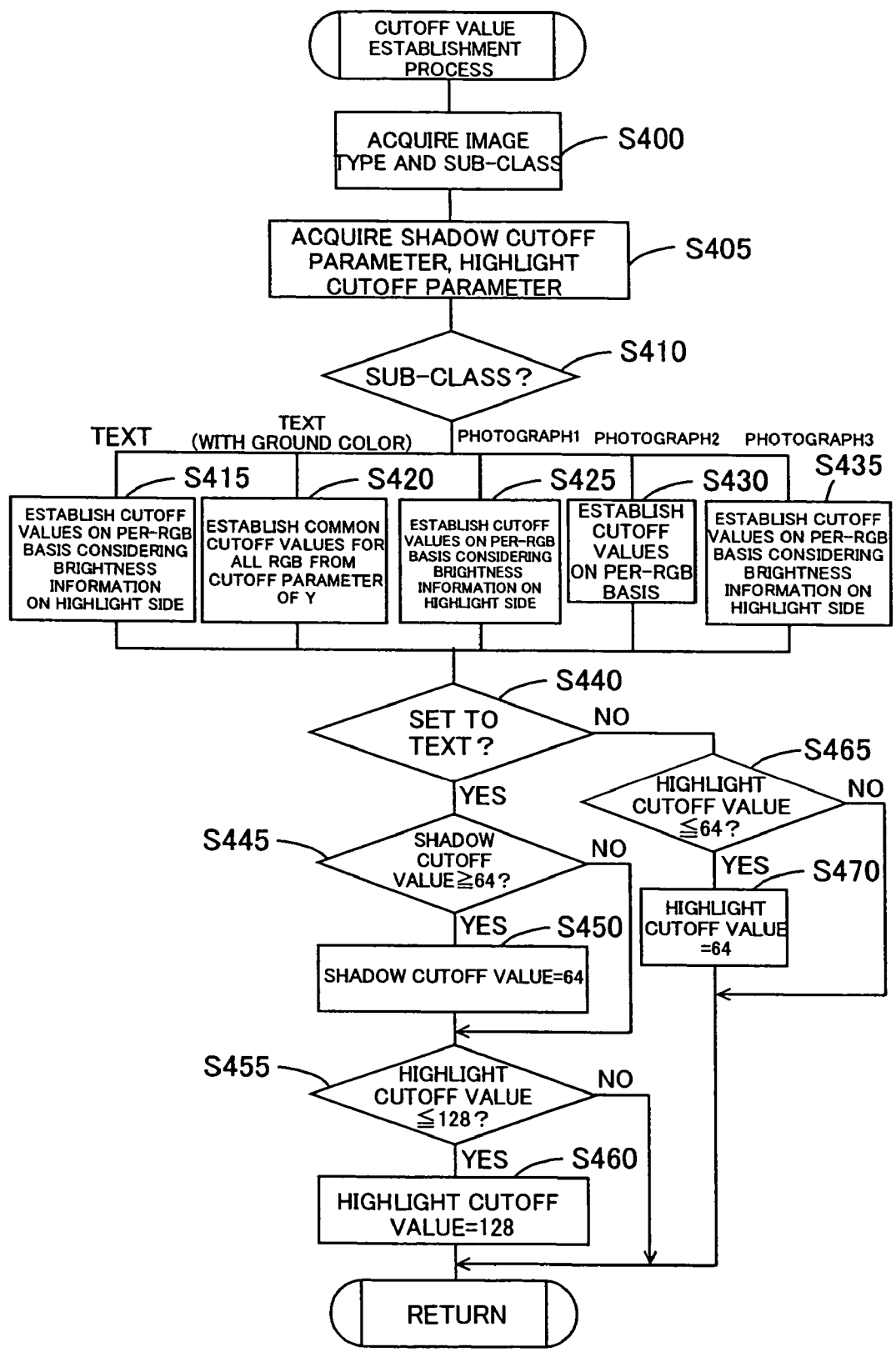
FIG. 9 is a flowchart of a cutoff value determination process.

(2-2) Cutoff Value Decision Process:

The cutoff value decision process in Step S130 will now be described in detail. FIG. 9 is a flowchart of a cutoff value decision process. In this embodiment, different contrast enhancement is carried out depending on individual image type and sub-class, and thus different cutoff values are used for individual sub-classes. First, making reference to the variable that indicates the aforementioned photograph type and sub-class, the type and sub-class of the previewed image are acquired (Step S400). Referring to the ROM 23, cutoff parameters (a shadow cutoff parameter and highlight cutoff parameter) corresponding to each sub-class are acquired (Step S405).

Cutoff parameters are parameters specifying proportions of pixels to be ignored for the shadow side and for the highlight side, during contrast enhancement; proportions could be specified as 1% on the shadow side and 50% on the highlight side, for example. In this example, it is indicated that 1% of pixels on the shadow side are ignored and 50% of pixels on the highlight side are ignored; more specifically, cutoff values for histograms of the RGB color components are specified in by the following process.

For this purpose, the aforementioned variable is referred to in order to determine the sub-class of the image (Step S410), and if not classified into the sub-class of text images with ground color, Step S415 is performed, or if classified into the sub-class of text images with ground color, Step S420 is performed. If the image type is a photograph and the sub-class is Photograph 1, Step S425 is performed; if the image type is a photograph and the sub-class is Photograph 2, Step S430 is performed; or the image type is a photograph and the sub-class is Photograph 3, Step S435 is performed.

Figure 10:
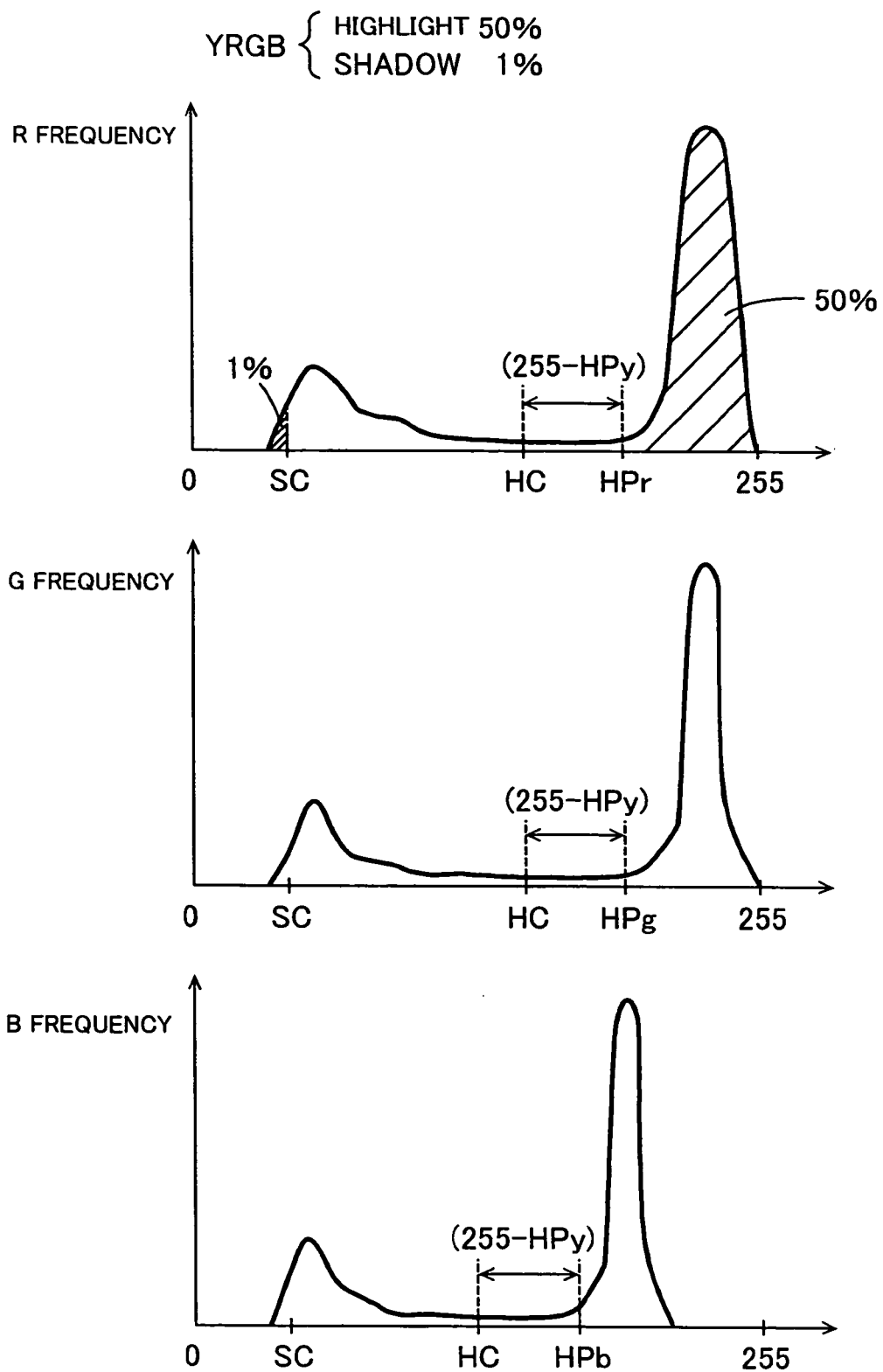
FIG. 10 is an example of histograms in a text image.

In Step S415, individual cutoff values are decided upon for each of the RGB components coupled with information about brightness Y on the highlight side. FIG. 10 is an example showing typical histograms for each of the RGB color components of an image not classified into the sub-class of text images having ground color. In all of the histograms for the RGB color components, a large peak appears on the highlight side, and a small peak appears on the shadow side.

The peak on the shadow side reflects the result of scanning text, while the peak on the highlight side reflects the white background. That is, these histograms are typical of an image having black text formed on a white background. In this instance, it will be preferable to perform contrast enhancement so that the brightest background becomes white and the darkest text becomes black; thus, in Step S415 cutoff values are selected such that contrast enhancement is carried out in this manner.

Specifically, in this sub-class, the highlight cutoff parameter is set to 50% and the shadow cutoff parameter to 1%, and these parameters are used to establish cutoff values for each of the RGB components. For the R component shown at top in FIG. 10, on the basis of the shadow cutoff parameter of 1%, there is established a shadow cutoff value SC such that the pixel count of pixels included in the segment from the minimum value to the shadow cutoff value SC in the R component histogram equals 1% of the total.

On the highlight side, on the basis of the highlight cutoff parameter of 50%, there is first established a provisional cutoff value HPr such that the pixel count of pixels included in the segment from the maximum value to the provisional cutoff value HPr in the histogram equals 50% of the total. Similarly, for the histogram of brightness Y, on the basis of the highlight cutoff parameter of 50%, there is first established a provisional cutoff value HPy such that the pixel count of pixels included in the segment from the maximum value to the provisional cutoff value HPy in the histogram equals 50% of the total. The difference between gradation value 255 and the provisional cutoff value HPy is then subtracted from the provisional cutoff value HPr, to establish a highlight cutoff value HC. Processes similar to the above process are carried out to establish cutoff values for the G component and the B component as well. That is, for sub-classes not judged to be text images with ground color, cutoff values are established on the basis of individual RGB histograms, with cutoff values differing for each of the RGB components. Even with such cutoff values, since no color cast is present in the background, the contrast enhancement process can be carried out without throwing off color balance.

The reason for setting the highlight cutoff parameter to 50% and ignoring a large number of pixels on the highlight side is intended to whiteout the background; once a provisional cutoff value has been established for each color component, a provisional cutoff value calculated from brightness Y is used to establish a highlight cutoff value HC so as produce greater cutoff. Accordingly, the background may be definitively rendered white.

In contrast adjustment carried out in the aforementioned Step S140, contrast is enhanced by applying a tone curve that associates the shadow cutoff value SC with a gradation value of "0" and the highlight cutoff value HC with a gradation value of "255." Of course, the tone curve may have a shape such as a γ curve, an S shaped curve, or a straight line. This applies to the sub-classes described hereinbelow as well.

Figure 11:
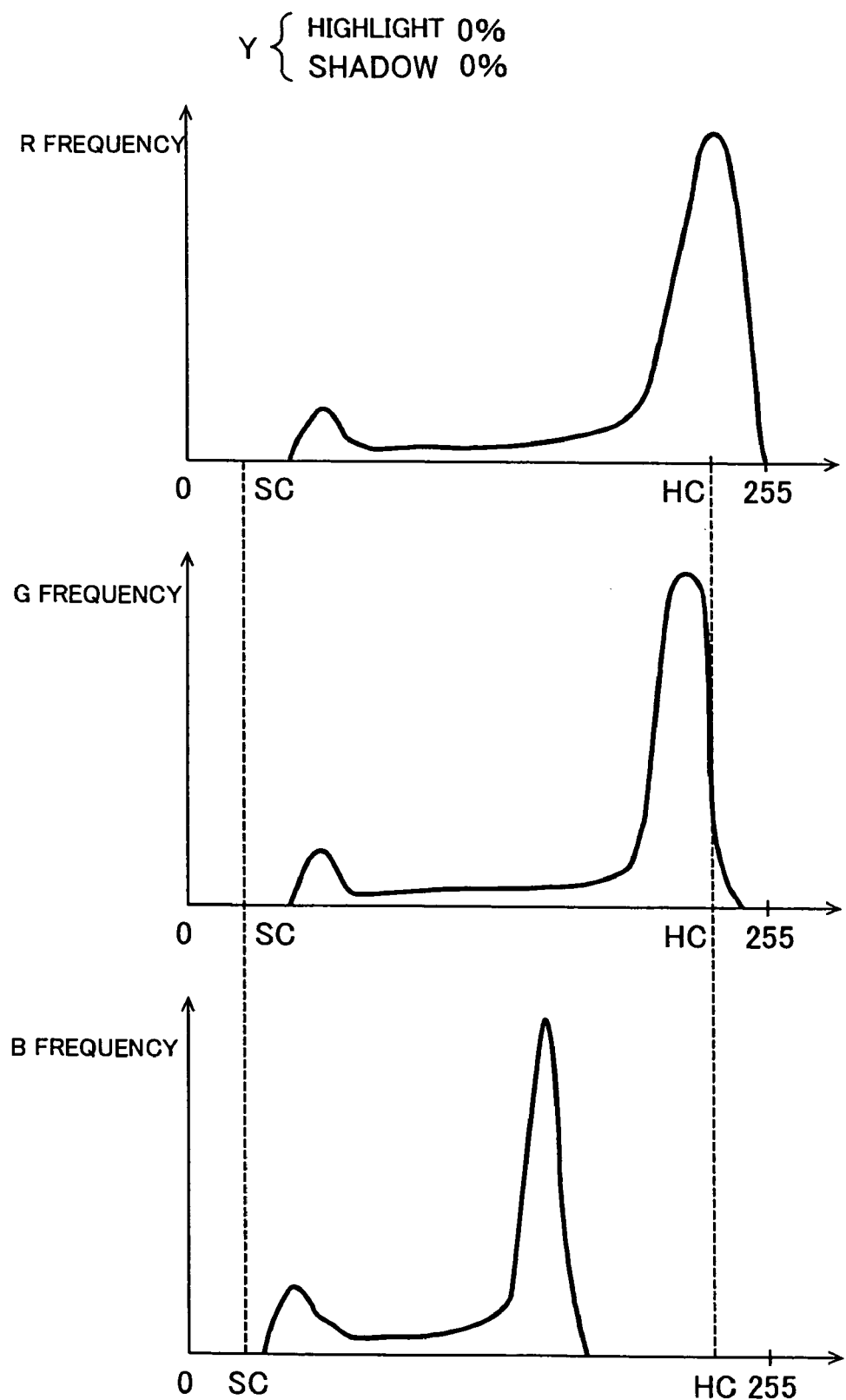
FIG. 11 is an example of histograms in a text image with ground color.

In Step S420, from the cutoff parameter of brightness Y, there is established a common cutoff value for all of the color components RGB. FIG. 11 is an example of histograms for the RGB color components of an image classified into the sub-class of text images having ground color. In the histograms for the R and G color components, a large peak appears on the highlight side, whereas in the B component, the peak on the highlight side is a gradation value smaller than the R and G components. Accordingly, the highlight area (background) of this image has a chromatic color cast (yellow in this example). While peaks are also present on the shadow side, these are peaks formed by black text. That is, this histogram is typical of an image having black text formed on chromatic ground color.

In this case, if the background, which has the highest brightness in the image, were rendered white, the background color would be altered; for this reason, there is established a cutoff value that is common to all of the RGB color components and that avoids causing excessive whiteout. Specifically, in this sub-class the highlight cutoff parameter is 0% and the shadow cutoff parameter is 0%, with the cutoff value being determined by applying these parameters to brightness Y only. That is, in this sub-class, it is preferable to establish the cutoff value based on brightness Y coupled with information for all color components, by means of establishing the cutoff value affected only by a specific color.

In this embodiment, both the highlight and shadow cutoff parameters are set to 0%, so the maximum value in the histogram of brightness Y is the highlight cutoff value HC, and the minimum value in the histogram of brightness Y is the shadow cutoff value SC. That is, in the sub-class of text images with ground color, contrast enhancement is carried out while preserving color balance as a common cutoff value for all of the RGB components.

In Step S425 and Step S435, the cutoff value is established in the same manner as in the aforementioned Step S415. Specifically, cutoff values are established individually for each of the RGB components, coupled with information about brightness Y on the highlight side. However, as the predetermined cutoff parameters differ for each sub-class, the established cutoff values per se will differ.

FIG. 12 is an example showing typical histograms for each of the RGB color components of a photograph image that is extremely bright. In these histograms, a large peak is present on the highlight end in all of the RGB color components, but there is no particularly noticeable peak on the shadow side. While this example is a photograph image, since average brightness is extremely high, in this embodiment, the image background is viewed as being white.

Accordingly, in Step S425, cutoff values are established so that the maximum brightness background becomes white, while preserving tonality in shadow portions. Specifically, in this sub-class (Photograph 1), the highlight cutoff parameter is 0.5% and the shadow cutoff parameter is 0%, with these parameters being used to establish the cutoff values for each of the RGB components. As shown in FIG. 12, in shadow portions, the minimum value of the histograms of the RGB components is the shadow cutoff value SC.

On the highlight side, on the basis of the highlight cutoff parameter being 0.5%, provisional cutoff values HPr, HPg, HPb are established from maximum values of the histograms for the RGB components. Next, for the histogram of brightness Y, on the basis of the highlight cutoff parameter being 0.5% there is established a provisional cutoff value HPy such that the pixel count of pixels included in the segment from the maximum value to the provisional cutoff value HPy in the histogram equals 0.5% of the total.

The difference between gradation value 255 and the provisional cutoff value HPy is then subtracted from the provisional cutoff values HPr, HPg, HPb, to establish a highlight cutoff value HC for each of the RGB components. That is, in a photograph image that is also an extremely bright image, the background is considered to be white, while cutoff values are established in consideration of highlight cutoff parameters of brightness Y and each of the RGB components on the highlight side. By so doing, whiteout can be produced reliably, and background color eliminated.

Figure 14:
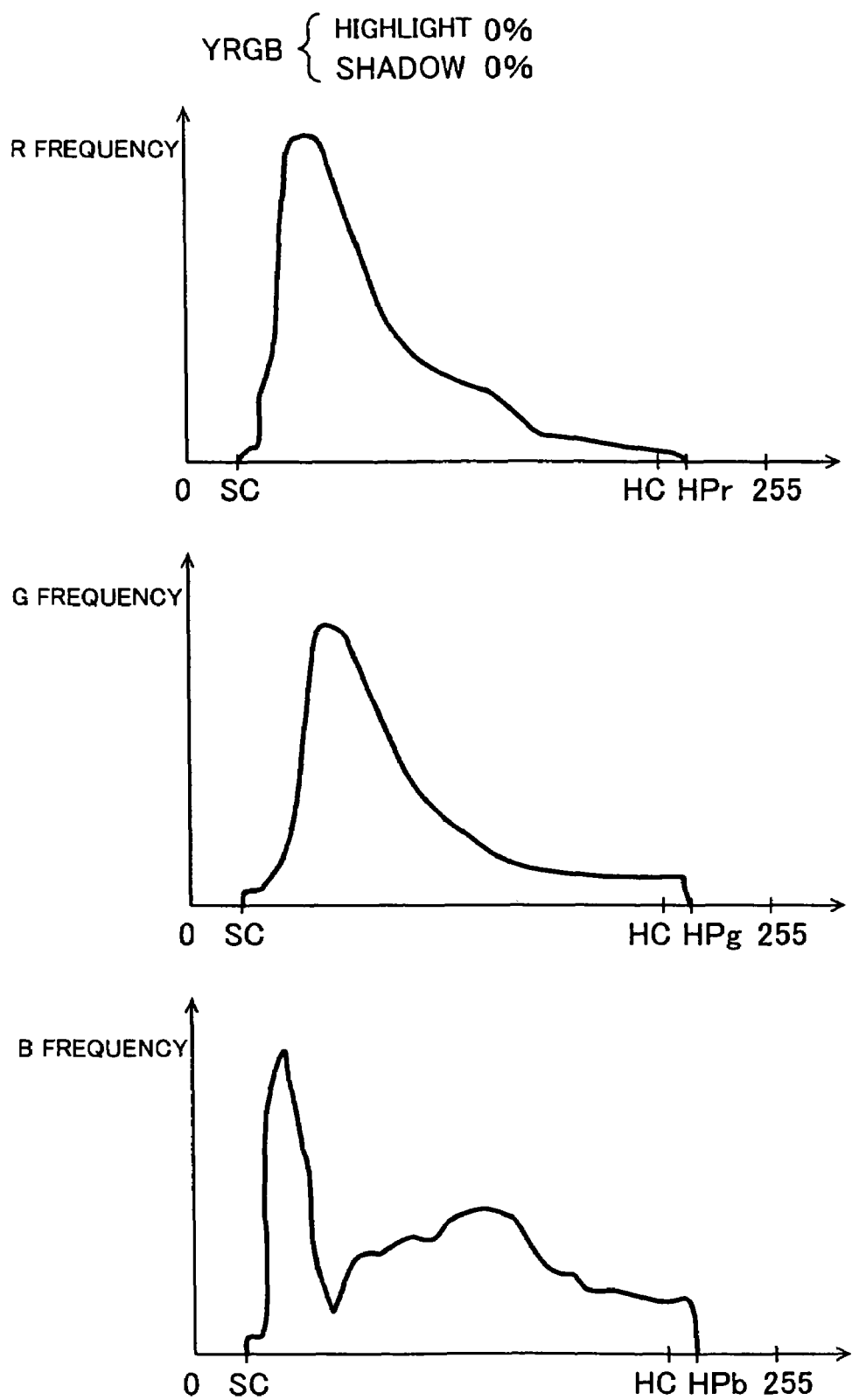
FIG. 14 is an example of histograms in an ordinary photograph image.

FIG. 14 is an example showing typical histograms for each of the RGB color components of an image of the Photograph 3 sub-class. This image includes a typical photograph where the sub-class is neither Photograph 1 or Photograph 2. In this image, there are no particular features of note in the histograms. Accordingly, in Step S435, contrast enhancement is performed in such a way as to avoid loss of overall tonality, as much as possible.

Specifically, in this sub-class (Photograph 3), the highlight cutoff parameter is 0% and the shadow cutoff parameter is 0%, with these parameters being used to establish the cutoff values for each of the RGB components. As shown in FIG. 14, in shadow portions, the minimum value of the histograms of the RGB components is the shadow cutoff value SC.

On the highlight side, on the basis of the highlight cutoff parameter being 0, provisional cutoff values HPr, HPg, HPb are established from maximum values of the histograms for the RGB components. Next, for the histogram of brightness Y, on the basis of the highlight cutoff parameter being 0%, there is established a provisional cutoff value HPy such that the pixel count of pixels included in the segment from the maximum value to the provisional cutoff value HPy in the histogram equals 0.5% of the total.

The difference between gradation value 255 and the provisional cutoff value HPy is then subtracted from the provisional cutoff values HPr, HPg, HPb, to establish a highlight cutoff value HC for each of the RGB components. That is, in an ordinary image, cutoff values are established so as to minimize cutoff of highlight portions, and contrast enhancement is carried out while preserving original gradation to the greatest extent possible.

Figure 13:
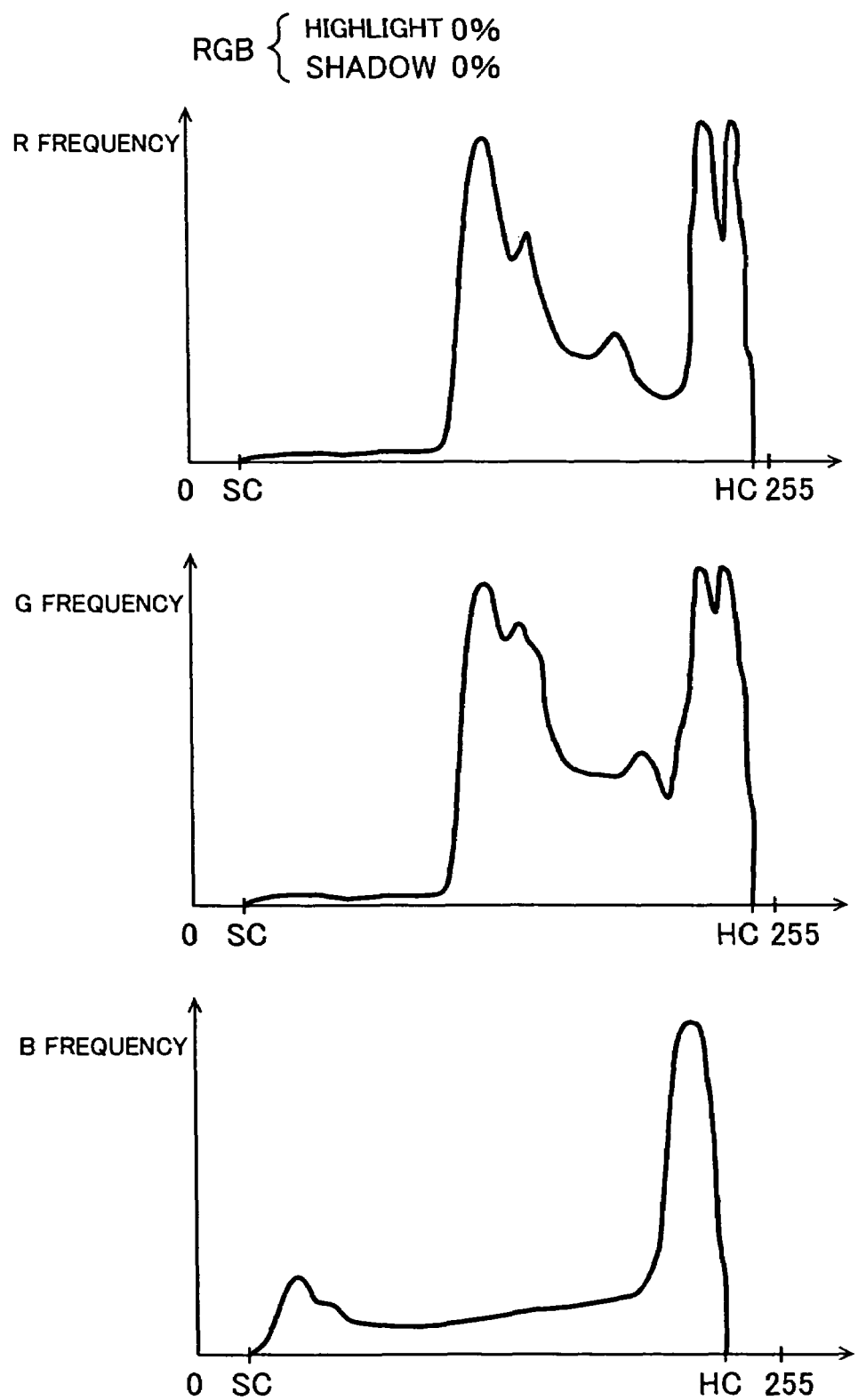
FIG. 13 is an example of histograms in a photograph image which is a light image.

In Step S430, cutoff values are established individually for each of the RGB components, without being coupled with brightness Y information. FIG. 13 is an example showing histograms for RGB color components in the Photograph 2 sub-class of images that are light overall but not as light as the Photograph 1 sub-class. In these histograms, while large peaks are present at the highlight side in all of the RGB color components, the peaks are not restricted to the highlight end, but appear also in the middle gradations.

In this embodiment, cutoff values are established so as to carry out contrast enhancement while holding down whiteout in the image. Specifically, in this sub-class the highlight cutoff parameter is 0% and the shadow cutoff parameter is 0% with no dimension of brightness information, so the shadow cutoff value SC is the minimum value in the histograms of the color components and the highlight cutoff value is the maximum value in the histograms of the color components. That is, with Photograph 2, contrast is enhanced while suppressing excessive whiteout in highlights.

Once cutoff values have been established in Steps S415-S435 in the above manner, in Steps S440-S470, modification is performed for the purpose of preventing pixels from being ignored excessively. This modification is based on threshold values that differ between image types that include text and image types that include photographs. For this purpose, first, it is determined whether image type has been set to text (Step S440). If determined that it has been set to text, it is then determined whether the shadow cutoff value is 64 or above (Step S445), and if the shadow cutoff value is 64 or above, the shadow cutoff value is set to 64 (Step S450).

If in Step S445 it is not determined that the shadow cutoff value is 64 or above, Step S450 is skipped. That is, an upper limit of 64 is imposed on the shadow cutoff value. By so doing, in the event that pixels on the shadow side are few in number but represent significant pixels, it is possible to prevent these pixels from being ignored. A hypothetical instance of significant pixels that are few in number would be one in which small amount of black text is present.

Next, it is determined whether the highlight cutoff value is 128 or less (Step S455), and if the highlight cutoff value is 128 or less, the highlight cutoff value is set to 128 (Step S460). In Step S455, if not determined that the highlight cutoff value is 128 or less, Step S460 is skipped. That is, a lower limit of 128 is imposed on the highlight cutoff value. By so doing, it is possible to prevent pixels from being ignored excessively on the highlight side.

If on the other hand, if it is determined in Step S440 that the image type has been set to text, it is then determined whether the highlight cutoff value is 64 or less (Step S465), and if the highlight cutoff value is 64 or less, the highlight cutoff value is set to 64 (Step S470). If it is not determined in Step S465 that the highlight cutoff value is 64 or less, Step S470 is skipped. That is, a lower limit of 64 is imposed on the highlight cutoff value. By so doing, it is possible to prevent pixels from being ignored excessively on the highlight side, resulting in whiteout. Once cutoff values have been established in the above manner, the routine returns to the process shown in FIG. 5.

(3) Other Embodiments

The embodiment set forth hereinabove is merely an example for realizing the invention, and it is possible to employ various other arrangements. For example, whereas in the preceding embodiment, the CPU 21 of the scanner 20 carries out the process of judging image type and image processing depending on the result of the judgment, it would be possible for these processes to be carried out by the CPU 31 of the copy control unit 30 or the CPU 41 of the printer 40 instead. Of course, besides an arrangement in which a CPU carries out processes according to a specific program, a custom IC for realizing the invention could be produced instead.

Additionally, while in the embodiment described above the invention is realized with copier 10 composed of an integrated scanner 20 and printer 40, it would also be possible to connect a scanner to an ordinary computer, and to have the ordinary computer carry out the process of judging image type and the image acquisition process depending on the result of the judgment. Of course, the recording material used in the printer 40 is not limited to four colors, and the printer could be an ink-jet printer.

Further, in the sense that the second judgment is carried out for the purpose of remedying an erroneous judgment in the first judgment, it is not essential to initially judge whether an image type is one that includes text. That is, initially it could be judged whether an image type is one that includes a photograph, followed by a judgment of whether the image type is one that includes text. Additionally, in the sense of judging image type is on the basis of a first scan, and reflecting it in the image scanning conditions during a second scan, it is not essential to carry out two judgments, namely the first judgment and the second judgment, but to instead simply judge whether an image is of a certain type.

Although the present invention has been described and illustrated in detail, it is clearly understood that the same is by way of illustration and example only and is not to be taken by way of limitation, the spirit and scope of the present invention being limited only by the terms of the appended claims. The disclosure of Japanese Patent Application No. 2004-273372 filed Sep. 21st, 2004 including specification, drawings and claims is incorporated herein by reference in its entirety.

What is claimed is:

1. A control method for an image scanning device that creates image data by scanning an image from a recording medium on which the image is recorded, comprising the steps of:

controlling said image scanning device to acquire first image data by scanning the image at a first scanning resolution;

judging whether an image type indicated by the first image data is a type including an artificial image or a type including a natural image;

rechecking whether the image type judged by the judging as the type including the artificial image is the type including the artificial image or the type including the natural image based on a criteria different from a criteria of the judging, and rechecking whether the image type judged by the judging as the type including the natural image is the type including the artificial image or the type including the natural image based on a criteria different from the criteria of the judging;

classifying the image type judged by the rechecking as the type including the artificial image into a detailed sub-class depending on whether ground color of the image includes chromatic color, and classifying the image type judged by the rechecking as the type including the natural image into a detailed sub-class depending on a level of brightness of the image;

determining a cutoff value specifying a gradation value of a shadow side being converted into a minimum value at a contrast enhancement process and a cutoff value specifying a gradation value of a highlight side being converted into a maximum value at the contrast enhancement process depending on the sub-class of the image type of the first image data;

controlling said image scanning device to acquire second image data by scanning the image at a second scanning resolution; and performing the contrast enhancement process on the second image data based on the determined cutoff values.

2. A control method for an image scanning device according to claim 1 wherein said first scanning resolution is a lower resolution than said second scanning resolution.

3. A control method for an image scanning device according to claim 1 comprising an image processing step for performing sharpness enhancement process on said second image data, by a degree of enhancement that is different according to said image type.

4. An image scanning device comprising:

an image scanning portion for scanning an image from a recording medium on which the image is recorded in order to acquire image data;

a scan control portion for controlling said image scanning portion to acquire first image data of the image scanned at a first scanning resolution;

an image judgment portion for judging whether an image type indicated by the first image data is a type including an artificial image or a type including a natural image;

a recheck portion for rechecking whether the image type judged by the image judgment portion as the type including the artificial image is the type including the artificial image or the type including the natural image based on a criteria different from a criteria of the judging, and for rechecking whether the image type judged by the image judgment portion as the type including the natural image is the type including the artificial image or the type including the natural image based on a criteria different from the criteria of the judging;

a classifying portion for classifying the image type judged by the recheck portion as the type including the artificial image into a detailed sub-class depending on whether ground color of the image includes chromatic color, and for classifying the image type judged by the recheck portion as the type including the natural image into a detailed sub-class depending on a level of brightness of the image;

a determining portion for determining a cutoff value specifying a gradation value of a shadow side being converted into a minimum value at a contrast enhancement process and a cutoff value specifying a gradation value of a highlight side being converted into a maximum value at the contrast enhancement process depending on the sub-class of the image type of the first image data;

the scan control portion for controlling said image scanning portion to acquire second image data of the image scanned at a second scanning resolution; and an image processing portion for performing the contrast enhancement process on the second image data based on the determined cutoff values.

5. A non-transitory computer-readable medium having a control program for an image scanning device encoded thereon that creates image data by scanning an image from a recording medium on which the image is recorded, comprising:

a scan control code for controlling said image scanning device to acquire first image data of the image scanned at a first scanning resolution;

an image judgment code for judging whether an image type indicated by the first image data is a type including an artificial image or a type including a natural image; and a recheck code for rechecking whether the image type judged by the image judgment code as the type including the artificial image is the type including the artificial image or the type including the natural image based on a criteria different from a criteria of the judging, and for rechecking whether the image type judged by the image judgment code as the type including the natural image is the type including the artificial image or the type including the natural image based on a criteria different from the criteria of the judging;

a classifying code for classifying the image type judged by the recheck code as the type including the artificial image into a detailed sub-class depending on whether ground color of the image includes chromatic color, and for classifying the image type judged by the recheck code as the type including the natural image into a detailed sub-class depending on a level of brightness of the image;

a determining code for determining a cutoff value specifying a gradation value of a shadow side being converted into a minimum value at a contrast enhancement process and a cutoff value specifying a gradation value of a highlight side being converted into a maximum value at the contrast enhancement process depending on the sub-class of the image type of the first image data;

the scan control code for controlling said image scanning device to acquire second image data of the image scanned at a second scanning resolution; and an image processing code for performing the contrast enhancement process on the second image data based on the determined cutoff values.

* * * * *